(12) United States Patent
Van Duivendijk et al.

(10) Patent No.: US 10,633,938 B2
(45) Date of Patent: Apr. 28, 2020

(54) TUBULAR PRODUCT CLAMP

(71) Applicant: ITREC B.V., Schiedam (NL)

(72) Inventors: Pieter Dirk Melis Van Duivendijk, Schiedam (NL); Theodorus Cornelis Joanes Maria Stijnman, Schiedam (NL); Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 232 days.

(21) Appl. No.: 15/570,137

(22) PCT Filed: Apr. 26, 2016

(86) PCT No.: PCT/NL2016/050297
§ 371 (c)(1),
(2) Date: Oct. 27, 2017

(87) PCT Pub. No.: WO2016/175655
PCT Pub. Date: Nov. 3, 2016

(65) Prior Publication Data
US 2018/0128061 A1 May 10, 2018

(30) Foreign Application Priority Data

Apr. 29, 2015 (WO) ................ PCT/NL2015/050287
Oct. 29, 2015 (NL) .................................. 2015684

(51) Int. Cl.
*E21B 19/07* (2006.01)
*E21B 19/10* (2006.01)

(52) U.S. Cl.
CPC .............. *E21B 19/07* (2013.01); *E21B 19/10* (2013.01)

(58) Field of Classification Search
CPC ................................ E21B 19/07; E21B 19/10
See application file for complete search history.

(56) References Cited

U.S. PATENT DOCUMENTS 1,886,343 A 11/1932 Livergood
3,748,702 A 7/1973 Brown
(Continued)

FOREIGN PATENT DOCUMENTS

CN 202417348 U 9/2012
CN 103397856 A 11/2013
SU 898039 A1 1/1982

OTHER PUBLICATIONS

International Search Report (PCT/ISA/210) issued in PCT/NL2015/050287, dated Oct. 9, 2015.
(Continued)

*Primary Examiner* — Michael R Wills, III
(74) *Attorney, Agent, or Firm* — Birch, Stewart, Kolasch & Birch, LLP

(57) ABSTRACT

The present invention relates to a tubular product clamp for supporting a tubular product, e.g. a drilling pipe, in a firing line of a drilling rig, and a method for supporting a tubular product in a firing line. The clamp comprises multiple clamping devices with a base part and a clamp part. According to the invention, an insert carrier is provided for each clamp part. The insert carriers each have an insert carrier body with one or more recesses for holding one or more inserts for engaging the tubular product supported by the product clamp.

20 Claims, 17 Drawing Sheets

(56) References Cited

U.S. PATENT DOCUMENTS

| | | | | |
|---|---|---|---|---|
| 4,269,277 A * | 5/1981 | Baugh | ............... | E21B 19/10 173/149 |
| 5,848,647 A * | 12/1998 | Webre | ............... | E21B 19/10 166/379 |
| 6,631,792 B2 * | 10/2003 | Buck | ............... | E21B 19/10 188/189 |
| 7,926,577 B2 * | 4/2011 | Thomas | ............... | E21B 19/10 166/380 |
| 2003/0066718 A1 | 4/2003 | Buck | | |
| 2008/0174131 A1 * | 7/2008 | Bouligny | ............... | E21B 19/07 294/197 |
| 2014/0262538 A1 * | 9/2014 | Louviere | ............... | E21B 19/10 175/423 |
| 2017/0051567 A1 * | 2/2017 | Roodenburg | ............... | E21B 19/10 |

OTHER PUBLICATIONS

International Search Report (PCT/ISA/210) issued in PCT/NL2016/050297, dated Oct. 19, 2016.
Written Opinion (PCT/ISA/237) issued in PCT/NL2015/050287, dated Oct. 9, 2015.
Written Opinion (PCT/ISA/237) issued in PCT/NL2016/050297, dated Oct. 19, 2016.

* cited by examiner

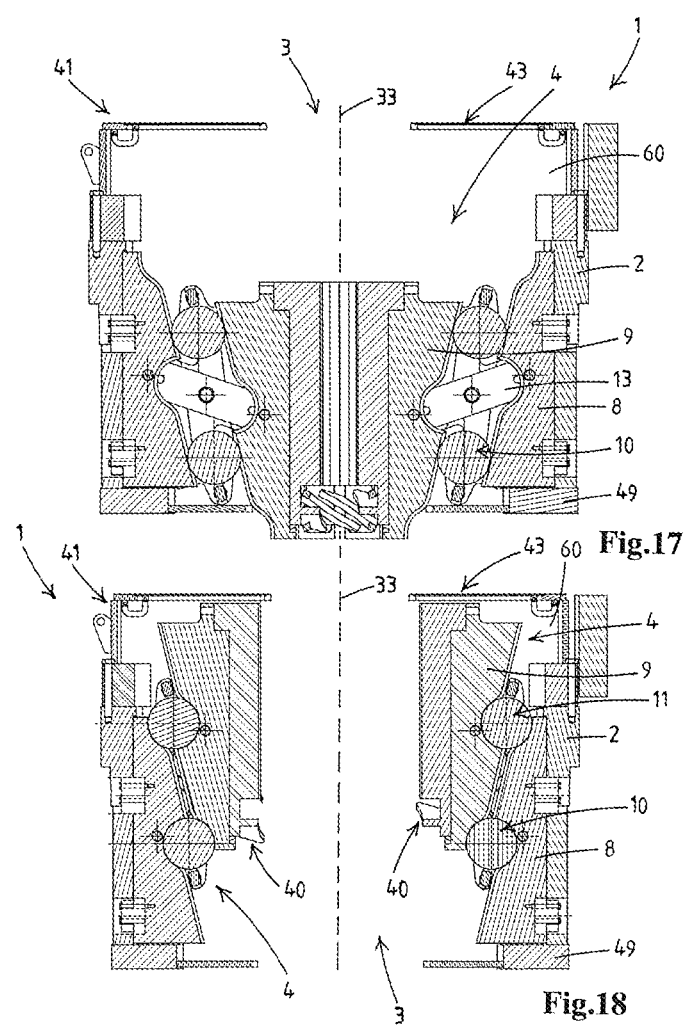

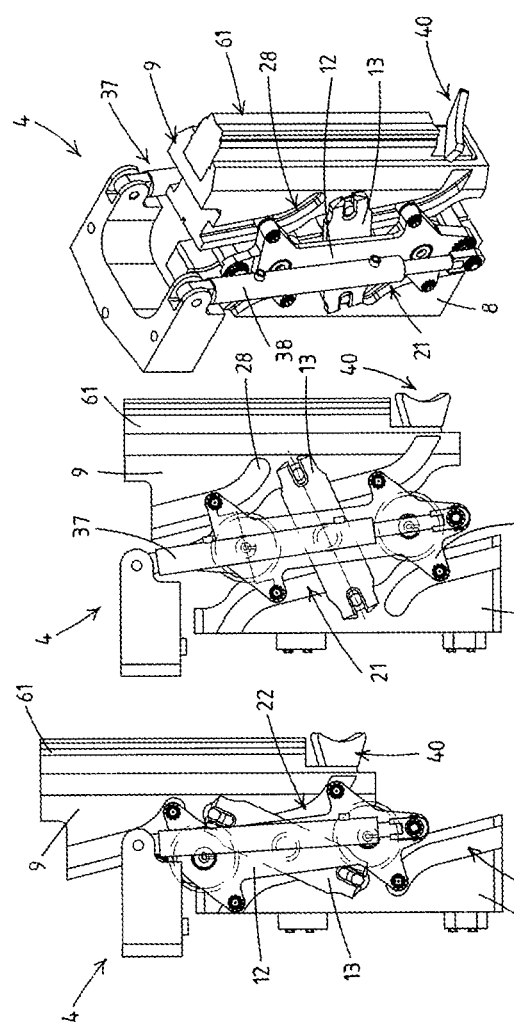

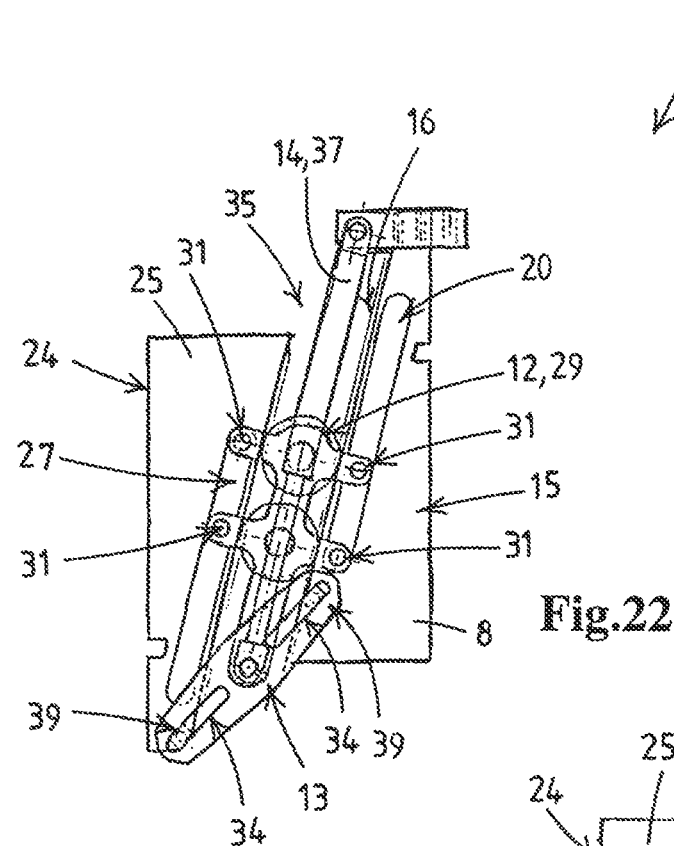
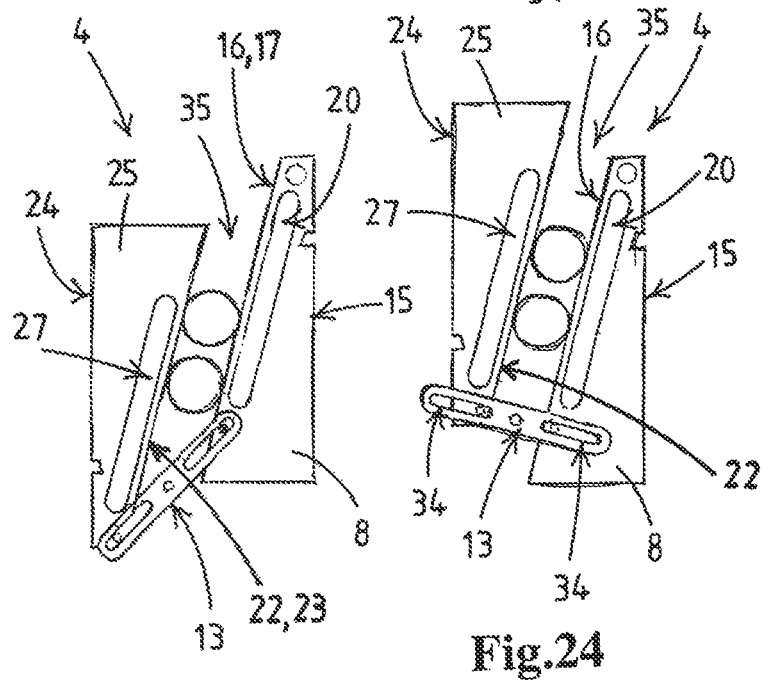
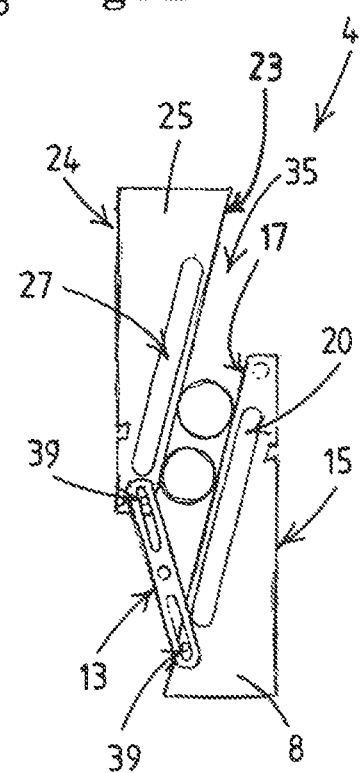

TUBULAR PRODUCT CLAMP

FIELD AND BACKGROUND OF THE INVENTION

This invention relates to a new and improved tubular product clamp, in particular to inserts of such a clamp.

Tubular product clamps such as slips are used in the oil industry for holding tubulars, such as drilling tubes in a firing line. Classic slips comprise a set of wedge shaped slip blocks, which are placed in a slip bowl to engage a drill pipe or casing. The angled surfaces of the slip blocks in combination with the angled surface of the slip bowl cause axial forces exerted by the tubular, e.g. drill pipe, on the slip blocks to be transferred into a lateral gripping force exerted on the drill pipe. Thus, the slip blocks support the tubular in the firing line and prevent it from slipping through the slip. The tubular can be disengaged by lifting the tubular to take the weight off the slip blocks. The slip blocks can then be lifted out of the slip bowl.

Known slips are provided with replaceable inserts, in the form of metal plates with a corrugated grip surface, which inserts form the gripping surface with which the product clamp engages the tubular. Typically, the slip blocks are provided with vertical slots, extending in the vertical direction along the side of the slip block facing the tubular product, into which these inserts are mounted.

Due to the clamping forces generated when supporting a tubular in a firing line, the wear of these inserts, more in particular of the gripping surface of the inserts, is significant. Therefore frequent maintenance and replacement of these parts is necessary. Often this requires removing the tubular product clamp from the firing line, opening the product clamp and/or partial deconstruction of the clamp. During the replacement of the inserts, the product clamp can not be used.

It is an object of the present invention to provide a tubular product clamp in which the above mentioned drawbacks are eliminated altogether or occur in a greatly reduced extent. In particular it is an object of the present invention to provide a new and improved tubular product clamp, which preferably allows for quick and easy replacement of the inserts.

SUMMARY OF THE INVENTION

The object of the invention is achieved by providing a tubular product clamp according to the disclosure of the invention. Such a product clamp can be used for supporting tubular products, such as drill string, risers and casing, or sections thereof, in the firing line of a drilling rig, for example a drilling rig on a drilling vessel. The invention furthermore provides an insert carrier for use in such a product clamp and a method for supporting a tubular product using such a product clamp.

The invention provides a tubular product clamp having a ring frame with three or more clamping devices, which clamping devices are provided at regular intervals along the inside of the ring frame around a central product passage having a central axis, wherein each clamping device comprises:
 a base part, which base part is mounted to the ring frame, the base part having a front side that defines a guide surface facing towards the central product passage,
 a clamp part, which clamp part has a back side that defines a guide surface facing the guide surface defined by the front side of the base part, and a front side facing the central product passage, wherein the guide surfaces of the base part and the clamp part define a guide track for guiding the clamp part relative to the base part, and wherein the guide surfaces, and thus the tracks defined by the guide surfaces, extend at an angle with the central axis of the product passage, such that by moving the clamp part relative to the base part along the guide track, the clamp part is moved along the axis of the product clamp as well as in radial direction thereof.

According to the invention, the tubular product clamp further comprises:
 an insert carrier for each clamp part, which insert carriers each have an insert carrier body with one or more recesses for holding one or more inserts for engaging the tubular product supported by the product clamp, and
 wherein each clamp part is in its front surface provided with a slot for supporting the insert carrier,
 which slot extends in a direction parallel to the central axis of the product passage and has an open top end for receiving the insert carrier, such that the insert carrier can be slid onto the clamp part in a downward direction substantially parallel to the axis of the tubular product clamp, and
 which slot is open towards the central product passage for holding the insert carrier body in the slot with the one or more inserts facing the central axis of the product clamp.

By providing the base part and the clamp part of a product clamp according to the invention with slanted guide surfaces, the clamp part can be moved between a radially inward and lower position and a radially outward and upper position. By moving the clamp parts in the radial direction, the product passage can be adjusted in size and tubulars of different cross section can be received in and supported by the product clamp. Furthermore, by thus linking the radial and axial movement of the clamp parts, an axially downward directed force due to the weight of a tubular product held by the clamp is transformed into a radially inward directed clamping force. It is submitted that these types of clamps, i.e. clamps having clamp parts that move along the central axis of the product clamp as well as in radial direction thereof, are also known as slips.

Known slips are provided with a contact surface with which they contact the support surface of the slip bowl. Due to the clamping forces generated when clamping a tubular in position, the wear in of these surfaces is significant. Therefore frequent maintenance and replacement of parts is necessary.

According to the invention, the insert carriers with their one or more inserts form the interface between the clamp parts and the tubular product supported by the tubular product clamp. With a product clamp according to the invention, an insert carrier can be removed from the clamp part to replace the one or more inserts held by the insert carrier. This facilitates replacement of the inserts.

Furthermore, while the inserts of one insert carrier are replaced, another insert carrier can be inserted in the product clamp. Thus, the down time of the product clamp due to replacement of the inserts is reduced.

Furthermore, the insert carrier can be removed from, and replaced into, the clamp part in a vertical direction. This allows for replacement of the inserts without the need of the product clamp, more in particular the ring frame of the product clamp, to be opened and/or the clamping devices to be removed from the ring frame. Thus, the inserts can be replaced while the product clamp remains located with its central axis in the firing line of a drilling rig. This also facilitates replacement of the inserts and reduces the down time of the product clamp due to replacement of the inserts.

In an embodiment according to the invention, each insert carrier is provided with multiple insert recesses, preferably aligned one above the other, each recess holding an insert, and wherein the inserts and the recesses have a contact surface that runs at an angle to the central axis of the product clamp, preferably runs substantially parallel to the guide surfaces of the clamp part and the base part, for directing the load of a tubular supported by the product clamp towards the clamp part.

Thus, the inserts are wedge shaped, each insert having a griping surface substantially parallel to the axis of product clamp and a contact surface extending at an angle to the axis of the product clamp, preferably substantially parallel to guide surfaces of the base part and the clamp part.

It is noted that the contact surfaces referred to are the surfaces via which, during use, the weight of the tubular supported by the clamp is transferred to the clamp. With known slips, the inserts are flat bodies, and the contact surfaces of slip blocks and the inserts run parallel to central axis of the product clamp. During use of the known product clamps, the friction between the contact surface of the insert and the contact surface of the slip block, which friction is induced by the radial clamping force, is sufficient for holding the inserts in place and transferring the weight of the tubular product from the insert to the slip block. However, with a product clamp according to the invention the contact surfaces of the insert and the insert carrier run at an angle to the central axis of the product clamp, preferably run substantially parallel to the guide surfaces of the clamp part and the base part. Thus, the friction between those contact surfaces is less critical in keeping the inserts in their position during use.

Furthermore, conventional clamps are not configured for the transfer in a vertical direction from insert to slipping block of the weight of a tubular string supported by the clamp, i.e. for the transfer of the load via the bottom edge of the plate shaped inserts to a bottom surface of the slot in which the insert is held. Typically, the bottom edge of the inserts has a small surface are, due to the flat configuration of the inserts. Thus, when the frictional force is insufficient for holding the inserts in place, for example because of the weight of the tubular being too large and/or the radial clamping force to small, the slipping block will not be able to support slips and tubular string and ultimately the clamp may fail.

With a product clamp according to the invention the wedge shape of the inserts prevents the inserts from slipping, more or less in the same way the wedge shaped clamp part is held in position under bad. Furthermore, a vertical load supported by the clamp is distributed over a large contact surface when transferred from insert to insert carrier. Thus, the clamp is less likely to fail in case of a reduced radial force and/or large weight of the tubular supported by the clamp.

By providing the insert carrier with multiple inserts above each other, the slanted contact surfaces of the insert and insert carrier can be combined with large combined grip surface and a compact design of the insert carrier, when seen in a direction parallel to the central axis of the product clamp.

In an alternative embodiment, a single long insert is provided with a corrugated back surface, comprising multiple teeth that each have a slanted contact surface for contacting a contact surface of the insert carrier.

In an embodiment, the contact surfaces of the inserts and the insert carrier run substantially parallel to the guide surfaces of the clamp part and the base part of the clamping device supporting the insert carrier. Thus the weight of a product supported by the clamp is optimally transferred from insert to insert carrier and from camp part to base part.

In an embodiment, the insert carrier is provided with multiple inserts, each held in an insert recess, which insert recesses are each provided with an insert securing device, the insert securing devices individually securing each insert in each insert recess. It is submitted that such a securing device limits the movement of the insert sufficiently to prevent the insert from falling out of the insert. However, the securing device allows for enough movement of the insert relative to the insert carrier to enable the insert to set relative to the insert carrier when loaded by the weight of a tubular, to thus prevent the weight of the product supported by the clamp from being transferred via the securing device instead of via the contact surfaces.

Thus, the inserts can individually set to the tubular product supported by the clamp, which allows for an optimal transfer of the load from product to clamp, and thus a reduced wear of the inserts.

In an embodiment of a tubular product clamp according to the invention, the angle of the guide surfaces of the base part and the clamp part, and preferably of the contact surfaces, relative to the axis of the product clamp is between ten and eighteen degrees, preferably is between twelve and sixteen degrees, for example is fourteen degrees. Such an angle allows for a compact design of the insert carrier and clamp, in combination with an optimal transfer of the weight of a product supported by the clamp to the clamp, via the inserts held in the insert carrier.

In an embodiment of a product clamp according to the invention, each clamp part is provided with an insert carrier securing device at the top end of the slot, for temporarily securing the insert carrier in the slot. In an embodiment, the insert carrier securing device uses bolts and/or pins temporarily secure the insert carriers in the slot of the clamp part.

In an embodiment of a clamp according to the invention, the slot in each clamp part has a semi-circular cross section, and the insert carrier, more in particular the body of the insert carrier, has a section with a semi-circular cross section, which semi-circular section is received in the slot such that the clamp part allows for the insert carrier to pivot to a certain extent about its longitudinal axis. Thus, the insert carrier can set relative to the tubular held in the firing line. By thus allowing the insert carrier to correct for slight changes in position of the tubular product held in the firing line, the grip of the inserts onto said product is increased, and wear is reduced.

It is submitted that the slot for receiving the insert carrier according to the invention has a wide section for holding a main part of the insert carrier, and a more narrow opening for exposing the insert recesses, and the inserts held therein, to the product passage. The narrow opening prevents the insert carrier from falling out of the slot. When the slot has a semi-circular cross section, the circumference of the wider section of the slot is thus essentially C-shaped. In an alternative embodiment, the cross section of the slot can have for example a rectangular cross section.

In an embodiment, the slot is milled or drilled out of a solid body that forms the main part of the clamp part. In an alternative embodiment, the slot can be a rectangular shaped recess in the clamp part, with for example rails mounted along the opening facing the product passage to provide flanges that restrict the opening facing to thus hold the insert carrier. Alternative embodiments of the slot, and the opening of the slot for holding the insert carrier, are also possible. It is noted that when the insert carrier is combined with a slot having a rectangular shaped cross section, the position of the insert carrier when inserted in the slow will be rotationally fixed.

In an embodiment the insert carrier has as insert carrier body having a section to be received in the slot, and a section which extends through the opening of the slot facing the product passage. In case the slot is provided with a semicircular, or C-shaped, cross section, the main part of the insert body has a circular shaped cross section, provided with a stem shaped section that extends through the opening facing the product passage, in which stem shaped section the one or more recesses for holding the inserts are provided.

In an embodiment, the insert carrier is a single integral body, for example a steel body, which has been provided with recesses for the inserts. In an alternative embodiment, the insert carrier body is composed out of different components.

In a further embodiment, the inserts have a curved gripping surface, such that it the gripping surface substantially fits the circumference of a tubular supported by the product clamp. In a further embodiment, this type of inserts is combined with an insert carrier that can pivot about its longitudinal axis as described above.
The curved gripping surfaces of the inserts promotes the inserts to position themselves relative to a tubular, supported on the central axis of the product clamp, when the clamp engages the product. This positioning of the inserts is further enabled by the moveably mounted insert carrier. Thus, combining the pivotable supported insert carrier with inserts having a curved gripping surface further promotes the inserts of the clamp to set themselves relative to the tubular supported in the central axis of the product clamp, and enhances the grip of the clamp on the tubular product and reduces wear of the gripping surfaces.

In an embodiment, of a tubular product clamp according to the invention each insert carrier has a spherical bottom end, which spherical bottom end is received in a corresponding recess provided at the bottom end of the slot of the clamp part. Thus, the insert carrier is at its bottom end provided with large contact area, which is beneficial for the transfer of load forces from the insert carrier to the clamp part, and furthermore allows for the insert carrier to be pivotably mounted in the clamp part as described above.

In an embodiment of a tubular product clamp according to the invention, each of the clamping devices is provided with a positioning device for receiving and positioning a tubular product supported in the central product passage relative to the clamp part, when the clamp part is moved towards that tubular product, which positioning device comprises two guide legs which extend at an angle to each other, such that they define a V-shape when seen in a direction along the axis of the central product passage, and which guide legs preferably are staggered relative to each other along the axis of the central product passage, which enables the guide legs of two adjacent guiding devices to overlap, when seen in a direction along the axis of the central product passage, when the clamp parts are moved towards the central axis.

By providing the clamping devices with such a positioning device, the clamping devices can move a tubular product which is not positioned and/or or aligned with the axis of the product passage of the tubular product clamp, into a position in which the tubular is, or is substantially, in line with the axis of the product clamp by moving the clamp parts into the radially inward direction.

The configuration of the positioning device allows for the guide legs to extend at a wide angle, and thus for a wide receiving opening between the guide legs, which enables engagement of a tubular products with a wide range of diameter and for correcting a wide range of incorrect positions, i.e. moving tubular products which are not supported in the firing line, more in particular are not correctly positioned on the axis of the product passage of the tubular product clamp, in line with the axis of the product clamp by moving the clamp parts into the radially inward direction.

In a further embodiment, the positioning device is provided in the form of a U-shaped centering plate, more in particular a plate having a U-shaped recess, which is mounted at an angle to a plane perpendicular to the axis of the central product passage, such that one leg is located higher than the other leg, which allows for a wide receiving opening in combination with the clamp parts of the clamping devices to be positioned closely adjacent each other and close to the central axis of the product passage.

Thus, the positioning device can be embodied in a simple and robust form, which furthermore, allows the device to be provided as a replaceable insert. Furthermore, mounting the centering plates at an angle to a plane perpendicular to the axis of the central product passage enables a compact design of the product clamp.

In yet a further embodiment, the centering plate has a recess at the center of the receiving opening, for centering a tubular received in the receiving opening. Providing such a recess furthermore enables the centering device to more precisely and more securely position the tubular relative to the inserts of the insert carrier of the clamping device.

In an embodiment, the positioning device is mounted on the clamp part of the clamping device, to position the tubular relative to the insert carrier and the inserts of the insert carrier.

In an alternative embodiment, the centering plate can be provided on the insert carrier, which, when the insert carrier is a pivotably mounted insert carrier as was described above, enable the positioning device to also position the inserts of the insert carrier, by pivoting the insert carrier, relative to the tubular.

In an embodiment the clamping devices are each provided with a pivotably mounted insert carrier having inserts with a curved gripping surfaces that substantially fits the circumference of the tubular to be held by the product clamp, and a centering plate with a recess at the center of the receiving opening, which centering plate is mounted on the clamp part of the clamping device. In such an embodiment, upon closing of the clamp by moving the clamp parts towards the center line of the product clamp, the positioning device first positions the tubular relative to the insert carrier and its inserts, such that the inserts engage the tubular product. When the tubular product is not in line with the center line of the product clamp, the curved gripping surfaces slightly pivot the insert carrier to provide the inserts with an optimal gripping position.

In an embodiment, the centering device is provided in the form of a centering insert which centering insert is removable mounted in a slot shaped recess provided on either the clamp part or the insert carrier, which slot shaped recess extends at an angle to a plane perpendicular to the axis of the central product passage It is noted that the clamp part is supported by the base part, at least when the clamp is supporting a tubular in its central product passage. In an embodiment of a product clamp according to the invention, the clamp part of each clamping device rests with its guide surface directly on the guide surface of the base part. In a further embodiment a guiding device, for example in the form of a frame, came track etc, is provided for guiding the clamp part relative to the base part along the guide track.

In an alternative embodiment of a product clamp according to the invention, the clamp part of each clamping device rests on the base part via an intermediate body, for example at least load transfer rollers. Preferably, the clamping devices are furthermore provided with a trolley frame, which trolley frame guides the load transfer rollers relative to the clamp part along a load transfer roller trajectory defined by the guide surfaces of the base part and the clamp part.

In an embodiment according to the invention, each clamping device of the tubular product clamp is provided with a clamp part that rests on the base part via at least two load transfer rollers. When moving the clamp parts of the clamping devices relative to the base parts, the load transfer rollers and the trolley frame guide the clamp part along the load transfer roller trajectory. Thus, the clamp part can be moved between a radially inward and lower position and a radially outward and upper. By moving the clamp parts in the radial direction, the product passage can be adjusted in size and tubulars of different cross section can be received in and supported by the product clamp.

In an embodiment of a product clamp according to the invention, the base part has a left side and a right side provided with cam tracks, the cam tracks extending substantially parallel to the guide surface defined by the front side;

the clamp part has a left side and a right side provided with cam tracks, the cam tracks extending substantially parallel to the guide surface defined by the back side; and the product clamp further comprises:

two load transfer rollers, which load transfer rollers are each provided between the guide surface of the base part and the guide surface of the clamp part to provide a rolling support for the clamp part; and a trolley frame, which trolley frame is configured for positioning the base part, the clamp part and the load transfer rollers relative to each other, which trolley frame carries the load transfer rollers, which load transfer rollers are each rotatably mounted in the trolley frame, wherein the trolley frame is provided with cam followers, with which cam followers the trolley frame engages the cam tracks in the sides of the base part and the clamp part; and wherein the guide surface of the base part and the guide surface of the clamp part define between them guide tracks for each of the load transfer rollers, which guide tracks extend at an angle with the axis of the central product passage such that by moving the clamp part relative to the base part, the clamp part is moved along the axis as well as in radial direction thereof.

By providing a rolling support for the clamp parts of the clamping devices, in the form of load transfer rollers that roll along guide surfaces provided on the clamp part and along guide surfaces provided on the base part, a low friction contact is provided between the clamp part and the base part, which reduces wear of the components compared to slips in prior art clamping systems. The low friction contact is enabled by providing a trolley frame carrying at least two load transfer rollers, which trolley frame is configured for positioning the base part, the clamp part and the load transfer rollers relative to each other.

Furthermore, the invention thus allows for compact clamping devices, which can be configured to be individually removed from the ring frame or with a section of the ring frame, and which thus allow for quick and easy movement of the tubular product clamp. When cam tracks are provided in the sides of the base part and the clamp part, they preferably extend substantially parallel to the guide surfaces of the base part and the clamp part, i.e. when a base part or a clamp part is seen in side view the contour of the guide surface has a shape similar to the center line of a cam track. In other words, the distance between the guide surface and the center of the cam track is constant along the length of the cam track. Thus, the cam track follows the line of movement of an axis of a load transfer roller rolling over the guide surface, which allows the trolley frame, or parts thereof, to position the load transfer roller, the base part and the clamp part relative to each other when the clamp part is moved relative to the base part and the load transfer roller rolls along the guides surfaces of the base part and the clamp part.

In an embodiment, the cam tracks extend along the length of the guide surfaces. In an alternative embodiment the cam tracks extend along only a main part of the guide surfaces and do not extend along an end section of the guide surfaces. If, in such an embodiment, a trolley frame is provided, the trolley frame, more in particular parts of the trolley frame, are preferably configured to pivot relative to the cam track to allow the load transfer roller to continue along the end section of the guide surfaces, as will be explained in more detail further on.

If present, the load transfer rollers are preferably carried by a trolley frame, i.e. are rotatably mounted in that frame, or parts thereof, such that the trolley frame positions the rollers relative to the base part and the clamp part. Preferably, the roller body of the load transfer roller is a massive body to allow for optimal load transfer between the clamp part and the base part. In an embodiment, the load transfer roller is provided with axle ends which are received in bearings provided on the trolley frame.

In an embodiment, the load transfer rollers are cylindrical shaped for rolling along flat guide surfaces. It is noted that in an alternative embodiment, the guide surfaces may have a slightly concave or convex shape and the roller body is provided with an outer surface that fits the curvatures of the guide surfaces.

In an embodiment of a tubular product clamp according to the invention, load transfer rollers are provided with one circumferential guide rib, for example one circumferential guide rib located at the center of each load transfer roller, or with multiple circumferential guide ribs, for example one circumferential guide rib at each end of the load transfer rollers, and the base part and/or the clamp part are provided with guide grooves for cooperating with a corresponding circumferential guide rib. When in such an embodiment the load transfer roller rolls along the guide surface, the one or more circumferential guide ribs are received in the guide grooves, and thus the load transfer roller is guided along the load transfer roller track defined by the guide surfaces of the base part and the clamp part.

In an embodiment, each clamping device comprises two load transfer rollers positioned between the base part on one side and the clamp part on the opposite side. In this embodiment the clamp part is supported by the base part, at least when the clamp is supporting a tubular in its central product passage, via the load transfer rollers. A trolley frame is preferably provided for keeping the components in the correct position relative to each other while the clamp part is moved relative to the base part.

By providing two load transfer rollers, the load is transferred from clamp part to base part over two points, which enables a substantially even load distribution. In an alternative embodiment, three or more load transfer rollers may be provided between the base part and the clamp part of a clamping device. However, in a clamp comprising three or more load transfer rollers, extra attention should be directed to securing even load distribution over those load transfer rollers, to prevent excessive wear or even damage to the load transfer rollers and the guide surfaces they roll along.

In an embodiment, the trolley frame is provided which has a left side part and a right side part which are connected via roller bodies carried between them. In an embodiment the trolley frame comprises a single rigid frame part on the left side and a single rigid frame part on the right side of the clamping device. In an alternative embodiment, the trolley frame comprises multiple frame parts on both sides of the clamping device, for example comprises multiple retainer arms on both sides of the clamping device, which frame parts may be pivotable connected, for example, the trolley frame may comprise multiple retainer arms which are pivotably mounted on a spacer arm on each side of the clamping device. In an embodiment, the trolley frame extends around the clamp part and/or the base part, or between the guide surfaces of the base part and the clamp part to provide a direct connection between the frame part or frame parts provided on the left side and the frame part or frame parts provided on the right side of the clamping device.

In an embodiment of a product clamp according to the invention, each clamping device comprises a trolley frame having a left side frame part on the left side of the clamp part and the base part and a right side frame part on the right side of the clamp part and the base part, which left side frame part and right side frame part carry the two load transfer rollers between them, which load transfer rollers are each rotatably mounted. In a preferred embodiment, the two frame parts are connected with each other via the load transfer rollers only, which provides a compact trolley frame.

Furthermore, the left frame part and the right frame part are each provided with cam followers with which cam followers the frame parts engage the cam tracks in the sides of the base part and the clamp part. Thus on each side of the clamping device the base part, the load transfer rollers and the clamp part are positioned relative to each other by a single frame part, in which the load transfer rollers are rotatably mounted and which engages both the base part and the clamp part with cams engaging the cam tracks provided in those parts. Positioning these components relative to each other with a single frame part enables a high degree of accuracy. Furthermore, it allows for a simple and compact trolley frame.

In a further embodiment, the left side frame part and the right side frame part each are provided with two cam followers for engaging the cam tracks on the base part and two cam followers for engaging the cam tracks on the clamp part. Providing the frame parts each with two cams engaging the base part and two cams engaging the clamp part enables the trolley frame to keep the clamp part at a predetermined distance to the base part, such that the load transfer rollers held between them engage both the guide surface on the base part and on the clamp part, and to prevent pivoting of the clamp part relative to the base part.

In a further embodiment, each clamping device further comprises a yoke, which yoke is configured for positioning the trolley frame relative to the base part and the clamp part while the clamp part is moved relative to the base part. Thus, the movement of the load transfer wheels is controlled, and slippage is prevented. The yoke is at a central part thereof pivotably mounted on the trolley frame, and is at opposite ends thereof provided with slots, one slot engaging a pivot on the base part and the other slot engaging a pivot on the clamp part.

In a further embodiment, both the left frame part and the right frame part are provided with a yoke. Thus, the trolley frame is positioned by the yokes on both sides of the clamping device, which is beneficial in preventing the trolley frame, and thus the load transfer rollers, from slanting.

In a further embodiment of a tubular product clamp, a straight line can be drawn through each cam follower for engaging the cam track on the base part, a central rotational axis of one of the load transfer rollers and a cam follower for engaging the cam track on the clamp part, which straight line preferably is perpendicular to a line drawn through the central rotational axis of the first load transfer roller and the central rotational axis of the second load transfer roller. Thus, on each side of the clamping device, the cams are located diametrically relative to the axis of the load transfer roller. In other words, the axis of the load transfer roller and the axis of two cams on the left side of the clamping device and of two cams on the right side of the clamping device are positioned in a single imaginary plane. Such a configuration enables the trolley frame to be guided smoothly through the cam tracks both when the clamp part, and thus the load transfer roller, moves upward and when it moves downward.

In a further embodiment of a tubular product clamp according to the invention, the left frame part and the right frame part are each H-shaped, the H-shaped frame parts each having a central leg extending along the guide track for the load transfer rollers defined by the guide surfaces of the base part and the clamp part. Such a frame part combines precise positioning of the base part, load transfer rollers and clamp part relative to each other with a smooth and precise guiding of the clamp part and the load transfer rollers when the clamp part is moved relative to the base part.

In an alternative embodiment the tubular product clamp according to the invention is provided with a trolley frame for each clamping device, which trolley frame has a lower retainer arm and an upper retainer arm on the left side of the clamp part and the base part and a lower retainer arm and an upper retainer arm on the right side of the clamp part and the base part, wherein one load transfer roller is carried between the left lower retainer arm and the right lower retainer arm and one load transfer roller is carried between the left upper retainer arm and the right upper retainer arm, which load transfer rollers are each rotatably mounted; and each of the retainer arms has a cam follower at one end for engaging one of the cam tracks provided on the base part and a cam follower at an opposite end for engaging one of the cam tracks provided on the clamp part.

Thus, the trolley frame comprises two retainer arms on each side of the clamping device, each arm positioning the clamp part relative to the base part and correctly positioning the load transfer roller between the clamp part and the base part. In combination, the lower and upper retainer arm furthermore prevent pivoting of the clamp part relative to the base part.

Providing separate retainer arms instead of a single frame part allows for the retainer arms to move relative to each other, and thus to pivot relative to each other and the clamping device. Thus, in the parking position, the clamp part can be positioned even closer to the base part when compared with a single peace, rigid frame part. Furthermore, such a configuration allows for wider range in track design for both the load transfer track, defined by the guide surfaces on the base part and the clamp part, and the cam tracks. It is in particular beneficial when the load transfer roller track has a curved end section that provides a parking position for the load transfer roller, which embodiment will be explained in more detail further on, while the cam track has no such curved end section. In such an embodiment, the retainer arms can pivot relative to the clamping device, while keeping parallel, to guide the load transfer rollers along the roller track while the cams are already located at the end position of the cam tracks. This will be explained in more detail further on.

In a further embodiment for each retainer arm a straight line can be drawn through the axis of the cam followers on opposite ends thereof and the central rotational axis of the load transfer rollers which is carried by the retainer arm. Thus, on each side of the clamping device, the cams are located diametrically relative to the axis of the load transfer roller. In other words, the axis of the load transfer roller and the axis of two cams on the left side of the clamping device and of two cams on the right side of the clamping device are positioned in a single imaginary plane. Such a configuration enables the trolley frame, more in particular the retainer arms of the trolley frame, to be guided smoothly through the cam tracks both when the clamp part, and thus the load transfer roller, moves upward and when it moves downward.

In an embodiment, the trolley frame further has at least one spacer arm which spacer arm is with one end rotationally connected to one of the two load transfer rollers, preferably to an axle of the roller body, and with its opposite end to the other one of the two load transfer rollers, preferably to an axle of the roller body. Thus the trolley frame also positions the two load transfer rollers relative to each other.

In an embodiment, a single spacer arm is provided at the center of the clamping device, and engages a mid section of the load transfer rollers.

In an alternative embodiment of a tubular product clamp according to the invention the trolley frame has a spacer arm on the left side of the clamp part and the base part and a spacer arm on the right side of the clamp part and the base part, which left side spacer arm is with one end rotationally connected to the left side lower retainer arm and with an opposite end rotationally connected to the left side upper retainer arm, and which right side spacer arm is with one end rotationally connected to the right side lower retainer arm and with an opposite end rotationally connected to the right side upper retainer arm. In a further preferred embodiment, both the spacer arms and the retainer arms are rotationally connected to the load transfer rollers, preferably to an axle of the load transfer roller, such that the load transfer bodies are coaxially and rotatably mounted in both the retainer arms and the spacer arms.

In a further embodiment each clamping device further comprises a yoke, which yoke is configured for positioning the spacer arm relative to the base part and the clamp part while the clamp part is moved relative to the base part, which yoke is at a central part thereof pivotably mounted on the spacer arm, and is at opposite ends thereof provided with slots, one slot engaging a pivot on the base part and the other slot engaging a pivot on the clamp part.

In an embodiment, each clamping device comprises a spacer arm on both the left side and the right side, which spacer arms are each provided with a yoke. In a further preferred embodiment, both the left frame part and the right frame part are provided with a yoke. Thus, the trolley frame, in this embodiment comprising an upper retainer arm, a lower retainer arm and a spacer arm on its left side and on its right side, is positioned by the yokes on both sides of the clamping device, which is beneficial in preventing the trolley frame, and thus the load transfer rollers, from slanting.

In an embodiment of a tubular product clamp according to the invention, each clamping device comprises load transfer rollers located between the base part and the clamp part as set out above, and a rack and pinion mechanism, which rack and pinion mechanism is provided between the respective load transfer rollers on the one hand and the base part and the clamp part on the other hand, to position the load transfer rollers relative to the base part and the clamp part while the clamp part is moved relative to the base part. Such a rack and pinion interface can thus be used instead of, or in addition to, a yoke and/or a spacer arm. In an embodiment, the rack and pinion mechanism can be integrated with circumferential guide flanges to further position the load transfer rollers in the axial direction.

In an embodiment, the rack and pinion mechanism comprises a left side sprocket wheel and a right side sprocket wheel mounted on opposite ends of each load transfer roller respectively, and preferably, the sprocket wheels are mounted on an axle end of the transfer rollers.

In this embodiment, the rack and pinion mechanism further comprises a lower chain and an upper chain on the left side of the clamp part and the base part and a lower chain and an upper chain on the right side of the clamp part and the base part, which chains are each with one end connected to the base part and with another end connected to the clamp part, and which chains preferably each extend along a substantially U-shaped trajectory, In this embodiment, the sprocket wheels of one of the two load transfer rollers engage the left lower chain and the right lower chain and the sprocket wheels of the other load transfer roller engage the left upper chain and the right upper chain, such that when the when the clamp part is moved relative to the base part the chains are pulled along the sprocket wheels.

In an alternative embodiment, the rack and pinion mechanism of the load transfer rollers comprises a rack provided on the base part and a rack provided on the clamp part and a sprocket wheel mounted on an axis of the load transfer roller, which sprocket wheel engages the one or both racks, such that when the clamp part is moved relative to the base part the sprocket wheel runs along the sprocket wheel. Thus, the movement of the load transfer wheels is controlled, and slippage is prevented.

In a further preferred embodiment, the guide surfaces of the base part and the clamp part of each clamping device define guide tracks that curve in a radially outward direction at their upper ends to provide the clamp part with a parking positon. Thus the guide surfaces of the base part and the clamp part are essentially J-shaped, having a substantially straight and slanted section and a shorter and more horizontal section at the upper end. The longer slanted sections of the guide surfaces define a clamping trajectory. In this clamping trajectory the angle of the guide surfaces is sufficiently steep for transferring the downward pull of a tubular into a clamping force. The upper ends of the guide surfaces curve outward and define a more horizontal orientated parking trajectory. This parking trajectory is provided for moving the clamping parts away from the central product passage to allow wide products or product sections, for example a device having a rectangular cross section mounted between two tubulars or the flanges of a tubular, to be passed through the product clamp. The parking section of the trajectory is not suitable for providing a clamping force.

The wide central product passage facilitates passing products through the product clamp and thus reduces the need of removing the tubular product clamp when passing products with a wide diameter along the firing line and through the product passage.

In an embodiment the guide surfaces are provided with a recess in which load transfer rollers can be received, which allows for the clamp part, when the load transfer rollers are parked in the recess, to be located closely adjacent the base part, and thus allows for a compact tubular product clamp in combination with a comparatively wide central product passage.

In an embodiment, the invention provides a tubular product clamp for clamping a tubular product e.g. a drilling pipe, the product clamp having a ring frame having three or more clamping devices, which clamping devices are provided at regular intervals along the inside of the ring frame around a central product passage having an axis, and wherein each clamping device comprises:

- a base part, which base part is mounted to the ring frame, a front side that defines a guide surface facing towards the central product passage, and a left side and a right side provided with cam tracks, the cam tracks extending substantially parallel to the guide surface defined by the front side;
- a clamp part, which clamp part has a back side that defines a guide surface facing the guide surface defined by the front side of the base part, a front side facing the central product passage, and a left side and a right side provided with cam tracks, the cam tracks extending substantially parallel to the guide surface defined by the back side;
- an insert carrier for each clamp part, which insert carriers each have an insert carrier body with one or more recesses for holding one or more inserts for engaging the tubular product supported by the product clamp, and
wherein each clamp part is in its front surface provided with a slot for supporting the insert carrier,
which slot extends in a direction parallel to the central axis of the product passage and has an open top end for receiving the insert carrier, such that the insert carrier can be slid onto the clamp part in a downward direction substantially parallel to the axis of the tubular product clamp, and which slot is open towards the central product passage for holding the insert carrier body in the slot with the one or more inserts facing the facing the central axis of the product clamp;
  - two load transfer rollers, which load transfer rollers are each provided between the guide surface of the base part and the guide surface of the clamp part to provide a rolling support for the clamp part;
  - a trolley frame, which trolley frame is configured for positioning the base part, the clamp part and the load transfer rollers relative to each other, the trolley frame having a left side frame part on the left side of the clamp part and the base part and a right side frame part on the right side of the clamp part and the base part, which left side frame part and right side frame part carrying the two load transfer rollers between them, which load transfer rollers are each rotatably mounted, and
wherein the left frame part and the right frame part are each provided with cam followers, with which cam followers the frame parts engage the cam tracks in the sides of the base part and the clamp part;
  - a yoke, which yoke is configured for positioning the trolley frame relative to the base part and the clamp part while the base part is moved relative to the base part, which yoke is at a central part thereof pivotably mounted on the trolley frame, and is at opposite ends thereof provided with slots, one slot engaging a pivot on the base part and the other slot engaging a pivot on the clamp part; and
wherein the guide surface of the base part and the guide surface of the clamp part define between them guide tracks for each of the load transfer rollers, which guide tracks extend at an angle with the axis of the central product passage such that by moving the clamp part relative to the base part, the clamp part is moved along the axis as well as in radial direction thereof.

In an embodiment of a tubular product clamp according to the invention, each clamping device is provided with an actuator, such as a hydraulic cylinder or electric spindle, that is adapted to move the clamp part relative to the base part, i.e. between its radially inward lower position and its radially outward upper position. In an embodiment, the clamp part is provided with electric motors for moving the clamp parts, for example electric motors driving sprocket wheels engaging a rack mounted on a trolley frame or on the clamp part. In these embodiments, the product clamp is actuator controlled.

In an embodiment, one actuator can be used to move the clamp parts of multiple clamping devices, for example of two adjacent clamping devices.

Alternatively, the clamp part is configured to be moved by manpower, for example is provided with a grip at its top side for engagement by hand or by a manual operated lifting device, for lifting the clamp part.

In yet another embedment, the parts of the clamping device are configured for engagement by an external lifting device such as a crane provided on the deck or a winch provided in a drilling mast.

In an embodiment, a control system is provided that controls the actuators of the clamping devices such that all the clamp parts are moved synchronously. In a further preferred embodiment, each clamping device is provided with two or more hydraulic cylinders and the cylinders of all clamping devices are connected to a single control cylinder, the control cylinder comprising a single plunger axle moving multiple plungers provided along that plunger axis, each plunger provided in a plunger room connected with a hydraulic cylinder of the tubular product clamp. Thus, by moving the plunger axle of the control cylinder all cylinders of the clamping devices, and thus all clamping parts of the tubular product clamp, are moved synchronously.

In an embodiment, the actuators of the respective clamping devices are provided between the base part and the clamp part, i.e. engage the clamp part directly. Thus, the lifting forces and the clamping forces exerted by the actuator enact directly onto the clamp part.

In a further embodiment, the actuator of each clamping device comprises two hydraulic cylinders, one on the left side of the base part and clamp part, and one on the right side of the base part and clamp part, to enact a more balanced pulling or pushing force.

In an alternative embodiment, the actuator of each clamping device is mounted between the base part and a trolley frame to move the frame relative to the base and thus the clamp part relative to the base part. It is noted that an actuator mounted between trolley frame and ring frame, or between trolley frame and a mount fixed to the base part and/or the ring frame is considered to be mounted between the trolley frame and the base part.

By providing the actuators between the base part and a trolley frame, and not between the base part and the clamp part, the actuator moves the clamp part indirectly, i.e. via the trolley frame, when the trolley frame supports and/or the load transfer rollers are coupled with the base part and the clamp part via a yoke and/or a rack and pinion interface. Furthermore, movement of the trolley frame translates in a larger movement of the clam part. Thus, in such an embodiment, the providing the actuator between the frame and the base part thus provides an efficient way to move the clamp part. This is especially beneficial when the actuator is a hydraulic cylinder or spindle, which can be smaller when the actuation trajectory can be kept short.

According to the invention, the clamp parts of the product clamp are each configured for supporting a clamp block in the form of an insert carrier, which insert carrier has an insert carrier body with one or more recesses for holding one or more inserts for engaging the tubular product supported by the product clamp.

This in contrast with clamp blocks, for example polyurethane bodies or dedicated steel bodies, for directly engaging the tubular body to be held by the clamp, i.e. without inserts. In such an embodiment, the clamp blocks would be the only interface between the clamp part and the tubular held by the clamp, and it would be the clamp block that is subjected to wear due to engaging the tubular. In such an embodiment, the clamp block itself has to be replaced at regular intervals due to wear, and not inserts mounted on the clamp block.

It is noted that the ring frame that supports the clamping devices can be configured in different ways.

In an embodiment, the ring frame comprises multiple segments which are linked together to form the frame. In such an embodiment, each segment may support a clamping device. To allow for lateral entry of a tubular into the ring frame, one or more sections may be hingeable connected such that they form an entry door for receiving a tubular. In an alternative embodiment, the ring frame comprises two c-shaped ring sections, each supporting multiple clamping devices, which in combination form the ring frame. In an embodiment, the c-shaped ring sections are at one end hingeable connected such that they can be pivoted relative to each other between an open configuration for receiving a tubular, and a closed configuration for holding a tubular.

It is noted that providing a ring frame that can be opened and closed allows for sliding the ring frame onto a tubular in a lateral direction, i.e. perpendicular to the longitudinal axis of that tubular. Thus, the ring frame can engage a tubular that is supported in the firing line of a drilling vessel, for example by sliding the open ring frame over the deck into a pre-clamping position, in which pre-clamping position the axis of the closed clamp will coincide with the firing line, and subsequently closing the ring frame such that the axis of the product clamp coincides with the firing line and thus with the longitudinal axis of the tubular supported in the firing line.

In an alternative embodiment, the ring frame is a fully fixed frame, and tubulars can only be received in the axial direction of the product clam, i.e. along the axis of the central product passage. In such an embodiment, the clamp parts and/or the clamping devices are preferably provided with a parking position, in which position they are moved in laterally outward direction relative to the axis of the product clamp, to provide the product clamp with an extra wide product passage for receiving tubulars.

Preferably, the clamping devices are releasable fixed in the ring frame, such that they can be replaced individually, for example for maintenance purposes.

In an embodiment of a tubular product clamp according to the invention, the ring frame of the tubular product clamp is supported on three or more load sensors, preferably resilient mounted load sensors provided between the ring frame and a base plate configured for supporting the ring frame. By supporting the tubular product clamp on three load sensors, the load supported by the clamping device can be monitored. This is especially beneficial when the ring frame is provided with four or more clamping devices. By supporting the ring frame with load sensors not each clamping device needs to be monitored individually by load sensors. Thus, by supporting the ring frame with three load sensors, the load is monitored in a simple and efficient manner.

The load sensors may for example be combined with a pack of multiple disc springs to resiliently support the ring frame.

In a preferred embodiment, the resilient mounted load sensors are provided between the ring frame and a base plate configured for supporting the ring frame. Thus, when the resilient supports are compressed to a certain extent, the ring frame lands on the base plate, which may for example be provided with supports for cradling sections of the ring frame, such that the ring frame is now supported by the base plate. In such an embodiment, the sensors only need to monitor a lower section of the working range of the tubular product clamp. Due to the limited working range, sensors can be used that more accurately monitor the loads in this particular range. Furthermore, since the sensors do not need to carry the load of the clamp when at its upper end of its working range, more delicate and more simple sensors can be used.

In a further embodiment, the sensors are coupled with a control system that is linked to actuators for moving the clamp parts. Preferably, the control system is configured to block movement of the clamp parts of the clamping devices in a direction away from the tubular when they are supporting a load. Thus, the clamp parts can only be moved away from the tubular when that tubular is supported by an external device, for example a crane or trolley mounted on a derrick, in such a way that the tubular is not supported by the clamp. Therefore, there is no risk of the tubular falling from the clamp when the clamp parts are moved.

It is noted that on drilling vessels clamping devices are not permanently mounted in the firing line. They are mobile equipment configured to be moved into the firing line when needed and to be removed again to provide additional working space if necessary. Therefore, in an embodiment the ring frame of the product clamp according to the invention is provided with lifting points for coupling with a lifting device such as a crane for handling the product clamp. In an alternative embodiment, the product clamp can be mounted in a larger moveably frame that is to be handled by for example cranes. In a further embodiment, the frame may be mounted on a track, provided on the deck of a drilling vessel, or on a construction below the deck, to be slid over the deck into and out of a position in the firing line.

The configuration of a product clamp according to the invention, in particular providing the insert carrier as an elongated body provided with multiple inserts mounted in line one above the other, allows for a compact design of the clamp which in turn enables a wide range of use. In an embodiment, the ring frame of the product clamp is configured to interface with a rotary table, such that the product clamp in combination with said rotary table can rotatably support a tubular.

Regarding the base part and the clamp part, in a preferred embodiment these are steel bodies that provide the guide surface at one face thereof, and with the cam track milled out in the sides thereof. By providing a single body with both the guide surfaces and the cam tracks, a high level of accuracy can be achieved with respect to the relative positions of these features. In an alternative embodiment, the base part and/or the clamp part can be composed out of multiple bodies mounted onto each other.

The invention furthermore provides a method for supporting a tubular product in a firing line, the method providing the steps:

positioning the product clamp such that its axis coincides with the firing line;

supporting a tubular product in the firing line;

moving the clamp parts of the clamping devices towards the tubular product until the inserts of the insert carriers supported in the clamp parts engage the tubular product;

lowering the tubular product until it is fully supported by the tubular product clamp.

A further method according to the invention comprises replacing the inserts, the method comprising the step of removing the insert carriers from the clamp parts to replace the one or more inserts held by the insert carriers. A further method comprises the step of inserting insert carriers with new inserts into the clamp parts, to replace the removed insert carriers, to thus reduce down time of the product clamp.

Due to the slanted configuration of the guide surfaces of the clamp part and the base part, the downward pull exerted on the inserts of an insert carrier by a tubular held in the product clamp is transferred in a radially inward directed clamping force. The larger the pull, the larger the clamping force.

In use, a tubular is supported in the central product passage of the clamp by a supporting device, for example by a crane or a trolley supported by a derrick. Subsequently the tubular is engaged by the clamp parts, more in particular by the gripping surfaces of the inserts of the insert carriers held by the clamp parts, by moving the clamp parts in the downward and radially inward direction. When the inserts engage the tubular, the supporting device can lower the tubular. The downward pull that is exerted by the tubular on the inserts pulls the insert carriers and thus the clamp parts further in the downward and thus inward direction. Thus, the downward pull is transferred into a clamping force.

In an embodiment, the actuators are configured to provide an initial clamping force, when engaging the tubular. In a further embodiment, the actuators are configured for providing an additional clamping force by pushing the clamping parts downward, and thus inward, after the inserts have fully engaged the tubular. This is especially beneficial when comparatively light loads are supported by the clamp, because these loads do only generate a limited clamping force.

The invention furthermore provides a clamping device for use in a tubular product clamp according to the invention The invention furthermore provides an insert carrier for use in a tubular product clamp according to the invention, and inserts for use in an insert carrier of a product clamp according to the invention.

The invention furthermore provides a tubular product clamp for clamping a tubular product e.g. a drilling pipe, the product clamp having a ring frame having three or more clamping devices, which clamping devices are provided at regular intervals along the inside of the ring frame around a central product passage having an axis, and wherein each clamping device comprises:

a base part, which base part is mounted to the ring frame, the base part having a front side that defines a guide surface facing towards the central product passage, a clamp part (9), which clamp part has a back side that defines a guide surface facing the guide surface defined by the front side of the base part, a front side facing the central product passage, characterized in that each clamp part is provided with multiple insert recesses, preferably aligned one above the other, each recess holding an insert according to the invention, and wherein the inserts and the recesses have a contact surface that runs substantially parallel to the guide surfaces of the clamp part and the base part for directing the load of a tubular supported by the product clamp towards the clamp part, and wherein preferably each insert recess is provided with an insert securing device, the insert securing devices individually securing each insert in each insert recess.

The invention furthermore provides a tubular product clamp for clamping a tubular product e.g. a drilling pipe, the product clamp having a ring frame having three or more clamping devices, which clamping devices are provided at regular intervals along the inside of the ring frame around a central product passage having an axis, and wherein each clamping device comprises:

a base part, which base part is mounted to the ring frame, the base part having a front side that defines a guide surface facing towards the central product passage, a clamp part (9), which clamp part has a back side that defines a guide surface facing the guide surface defined by the front side of the base part, a front side facing the central product passage, characterized in that each clamp part is provided with the positioning device is provided in the form of a U-shaped centering plate which is mounted at an angle to a plane perpendicular to the axis of the central product passage, such that one leg is located higher than the other leg, which allows for a wide receiving opening in combination with the clamp parts of the clamping devices to be positioned closely adjacent each other and close to the central axis of the product passage.

Advantageous embodiments of the tubular product clamp according to the invention are disclosed in the description, in which the invention is further illustrated and elucidated on the basis of a number of exemplary embodiments, of which some are shown in the schematic drawing.

BRIEF DESCRIPTION OF THE DRAWINGS

In the drawings

FIG. 17 shows a side view in cross section of the tubular product clamp of FIG. 15 in a first working position;

FIG. 18 shows a side view in cross section of the tubular product clamp of FIG. 15 in a second working position:

FIG. 19 shows a side view of a clamping device of the tubular product clamp of FIG. 15 in a first working position;

FIG. 20 shows a side view of the clamping device of FIG. 19 in a second working position;

FIG. 21 shows a perspective view of the clamping device of FIG. 19;

FIG. 22 shows, partially in see through, a side view of an alternative clamping device;

FIG. 23 shows a side view of the clamping device of FIG. 22 in a first position;

FIG. 24 shows a side view of the clamping device of FIG. 22 in a second position; and FIG. 25 shows a side view of the clamping device of FIG. 22 in a third position;

DETAILED DESCRIPTION

Further objects, embodiments and elaborations of the apparatus and the method according to the invention will be apparent from the following description, in which the invention is further illustrated and elucidated on the basis of a number of exemplary embodiments, with reference to the drawings.

Figures 32, 33:
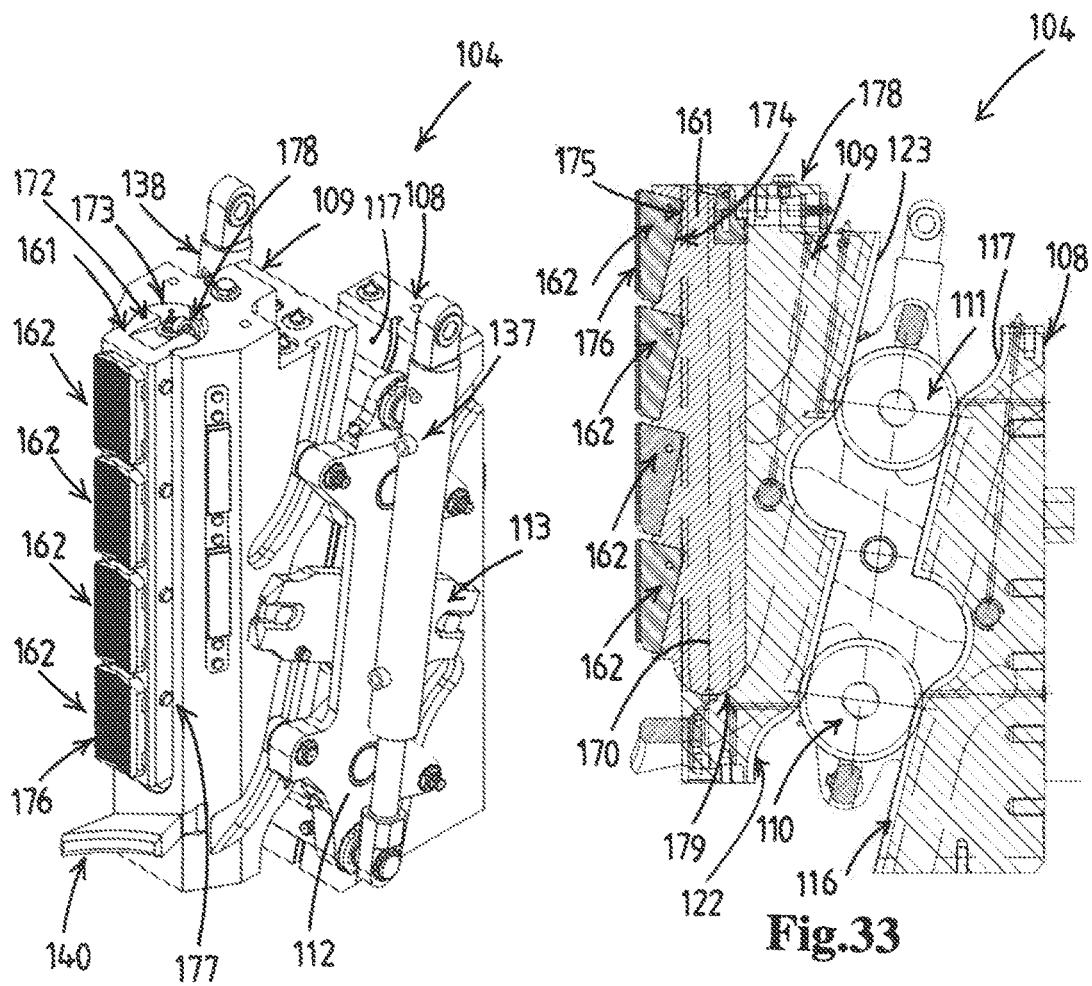
FIG. 32 shows a detailed view of a clamping device with an insert carrier according to the invention.
FIG. 33 shows the clamping de vice of FIG. 32 in cross section.
Figure 34:
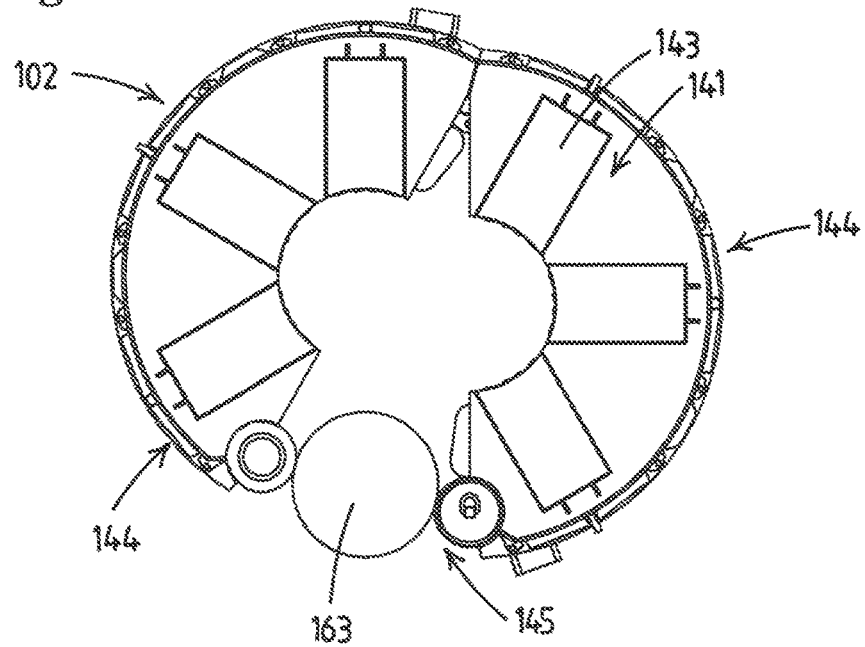
FIG. 34 shows a top view of the two part ring frame of the tubular product clamp of FIG. 15 in an open configuration while engaging a tubular product.

FIG. 32 shows a detailed view of a clamping device 104 for use in a tubular product clamp according to the invention. Such a product clamp can be used for supporting tubular products, such as drill string, risers and casing, or sections thereof, in the firing line of a drilling rig, for example a drilling rig on a drilling vessel. According to the invention, the clamping device 104 is provided with an alternative clamping block 61, i.e. with an insert carrier 161 instead of an insert block.

In the exemplary embodiment shown, the clamping device 104 comprises a base part 108, which base part 108 is to be mounted to a ring frame, the base part having a front side 116 that defines a guide surface 117 facing towards a central product passage when the clamping device is mounted on the ring frame of a product clamp according to the invention, a clamp part 109, which clamp part 109 has a back side 122 that defines a guide surface 123 facing the guide surface 117 defined by the front side 116 of the base part 108, and a front side 124 facing the central product passage when the clamping device is mounted on the ring frame of a product clamp according to the invention;

an insert carrier 161 for each clamp part 109, which insert carriers 161 each have an insert carrier body 170 with one or more recesses 171, in the particular embodiment shown four, for each holding one or more inserts 162, in the particular embodiment shown for each holding one insert 162, for engaging a tubular product supported by the product clamp.

Each clamp part 109 is in its front surface 124 provided with a slot 172 for supporting the insert carrier 161. When the clamping device is mounted no the ring frame of a product clamp, the slot 172 extends in a direction parallel to the central axis of the product passage of the product clamp.

The slot 172 has an open top end 173 for receiving the insert carrier 161, such that the insert carrier can be slid onto the clamp part 109 in a downward direction substantially parallel to the axis of the tubular product clamp. The slot 172 is open towards the central product passage of the product clamp for holding the insert carrier body 170 in the slot with the one or more inserts 162 facing the facing the central axis of the product clamp. It is noted that the inserts extend out of the slot of the clamp part, such that they, and not the clamp part, contact a tubular supported in the product passage of the product clamp.

For each clamping device, the guide surfaces 117, 123 of the base part 108 and the clamp parts 109 define a guide track 135 for guiding the clamp part relative to the base part. When mounted on the ring frame of the product clamp, the guide surfaces 117, 123, and thus the track 135 defined by the guide surfaces, extend at an angle with the central axis of the product passage of the product clamp, such that by moving the clamp part 109 relative to the base part 108 along the guide track 135, the clamp part 109 is moved along the axis of the product clamp as well as in radial direction thereof.

By providing the base part 108 and the clamp part 109 of a product clamp according to the invention with slanted guide surfaces, the clamp part 109 can be moved between a radially inward and lower position and a radially outward and upper position. By moving the clamp parts in the radial direction, the product passage of the product clamp can be adjusted in size and tubulars of different cross section can be received in and supported by the product clamp. Furthermore, by thus linking the radial and axial movement of the clamp parts, an axially downward directed force due to the weight of a tubular product held by the clamp is transformed into a radially inward directed clamping force. It is submitted that these types of product clamps, i.e. clamps having clamp parts that move along the central axis of the product clamp as well as in radial direction thereof, are also known as slips.

It is noted that with a clamping device according to the invention the clamp part is supported by the base part, at least when the clamp is supporting a tubular in its central product passage. In an embodiment of a product clamp according to the invention, the clamp part of each clamping device rests with its guide surface directly on the guide surface of the base part. In a further embodiment a guiding device, for example in the form of a frame, came track etc, is provided for guiding the clamp part relative to the base part along the guide track.

In the exemplary embodiment shown the clamp part 108 of the clamping device 104 rests on the base part 109 via an intermediate body, in the particular embodiment shown two load transfer rollers 110, 111, which load transfer rollers are each provided between the guide surface of the base part and the guide surface of the clamp part to provide a rolling support for the clamp part.

By providing a rolling support for the clamp parts of the clamping devices, in the form of load transfer rollers that roll along guide surfaces provided on the clamp part and along guide surfaces provided on the base part, a low friction contact is provided between the clamp part and the base part, which reduces wear of the components compared to slips in prior art clamping systems.

The clamping devices are furthermore provided with a trolley frame 112. The trolley frame 112 is configured for positioning the base part 109, the clamp part 109 and the load transfer rollers 110, 111 relative to each other. In the particular embodiment shown, the trolley frame carries the load transfer rollers, which load transfer rollers are each rotatably mounted in the trolley frame. The trolley frame is configured to guide the load transfer rollers 110, 111 relative to the clamp part 108 along a load transfer roller trajectory 135 defined by the guide surfaces of the base part and the clamp part.

The base part 108 has a left side 118 and a right side 119 provided with cam tracks 120, 121, the cam tracks extending substantially parallel to the guide surface 117 defined by the front side of the base part.

The clamp part 109 also has a left side 125 and a right side 126 provided with cam tracks 127, 128 the cam tracks extending substantially parallel to the guide surface 123 defined by the back side of the clamp part.

The trolley frame 112 is furthermore on its left side and its right side provided with cam followers 131, 132. The cam followers 131, 132 of the trolley frame engage the cam tracks 127, 128 in the sides of the base part 108 and the clamp part 109.

In the embodiment shown, low friction contact between clamp part and base part is enabled by providing a trolley frame 112 carrying the two load transfer rollers 110, 111, which trolley frame 112 is configured for positioning the base part 108, the clamp part 109 and the load transfer rollers relative to each other.

Figure 35:
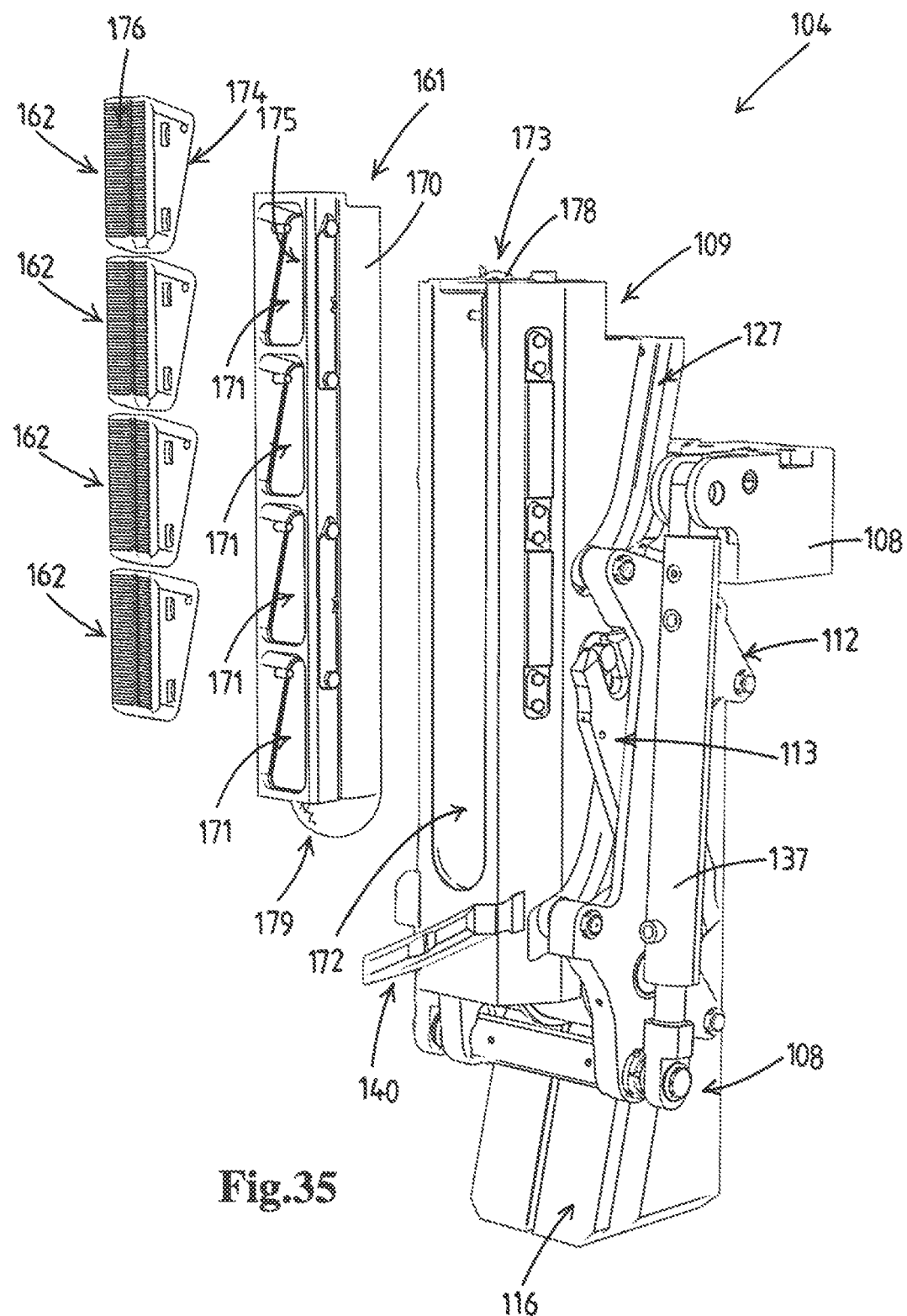
FIG. 35 shows a first perspective view of part of the clamping device of FIG. 32, with the insert carrier and inserts in an exploded view type perspective drawing.
Figure 36:
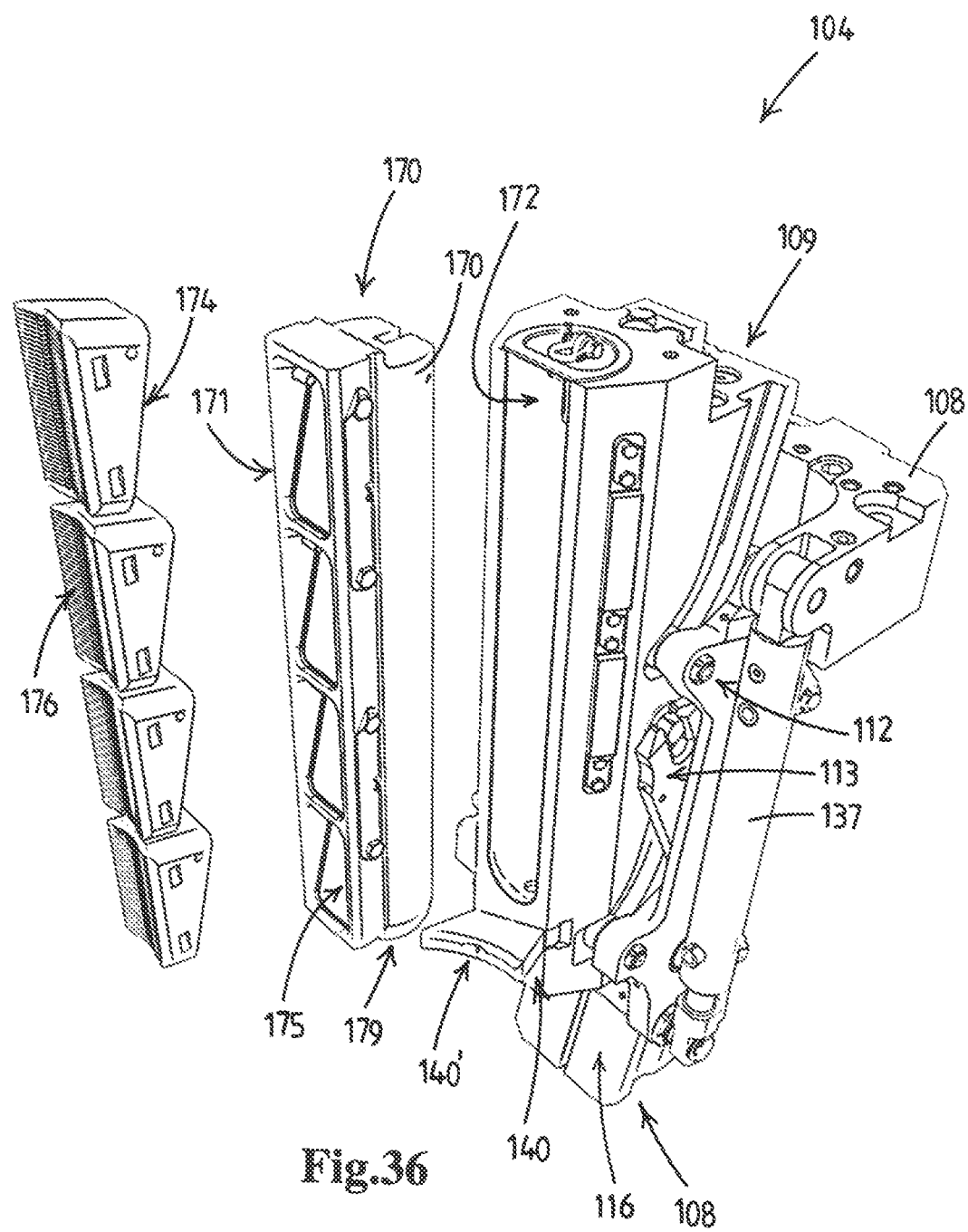
FIG. 36 shows a second perspective views of part of the clamping device of FIG. 32, with the insert carrier and inserts in an exploded view type perspective drawing.
Figure 37:
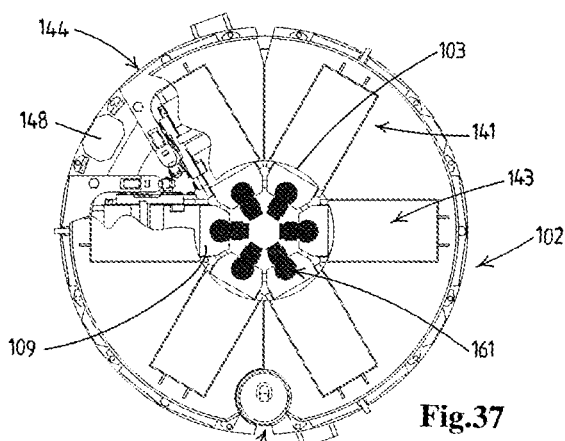
FIGS. 37 and 38 show a product clamp according to the invention, which product clamp is similar to the one shown in FIG. 16; which product clamp is provided with the clamping device if FIG. 32.
Figure 38:
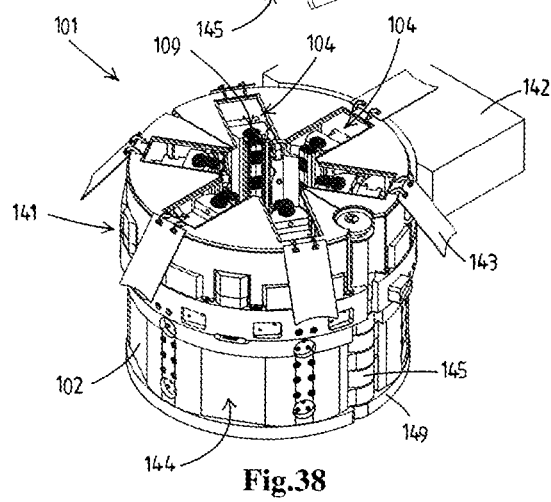

FIG. 33 shows the clamping device of FIG. 32 in cross section, while FIGS. 35 and 36 show perspective views of part of the clamping device 104 of FIG. 32, with the insert carrier 161 and inserts 162 in an exploded view type perspective drawing. FIG. 37 show a product clamp according to the invention, which product clamp is similar to the one shown in FIG. 16; which product clamp is provided with the clamping device if FIG. 32.

According to the invention, the insert carrier 161 has one or more inserts, in the particular embodiment shown has four inserts 162, which inserts form the interface between the product clamp and the tubular product supported by the tubular product clamp. With a product clamp according to the invention, an insert carrier can be removed from the clamp part to replace the one or more inserts held by the insert carrier. This facilitates replacement of the inserts.

Furthermore, while the inserts of one insert carrier are replaced, another insert carrier can be inserted in the product clamp. Thus, the down time of the product clamp due to replacement of the inserts is reduced.

Furthermore, the insert carrier can be removed from, and replaced into, the clamp part in a vertical direction. This allows for replacement of the inserts without the need of the product clamp, more in particular the ring frame of the product clamp, to be opened and/or the clamping devices to be removed from the ring frame. Thus, the inserts can be replaced while the product clamp remains located with its central axis in the firing line of a drilling rig. This also facilitates replacement of the inserts and reduces the down time of the product clamp due to replacement of the inserts.

In the embodiment shown, the insert carrier 161 is provided with multiple insert recesses 171, which are aligned one above the other. Each recess 171 holds an insert 162. The inserts 162 have a contact surface 174 and the recesses 171 have a contact surface 175, which contact surfaces are adjacent each other when the insert is mounted in the recess. When the clamping part engages a tubular product, the load is transferred from the insert to the insert carrier body via these contact surfaces. When the clamping device 101 is mounted on a ring frame of a product clamp, the contact surfaces 174,175 run at an angle to the central axis of the product clamp, in the preferred embodiment shown run substantially parallel to the guide surfaces of the clamp part and the base part, for directing the load of a tubular supported by the product clamp towards the clamp part.

Thus, the inserts are wedge shaped, each insert having a griping surface 176 substantially parallel to the axis of product clamp and a contact surface 174 extending at an angle to the axis of the product clamp, and, in the embodiment shown substantially parallel to guide surfaces 117, 123 of the base part 108 and the clamp part 109 respectively.

In the embodiment shown, the insert carrier 161 is provided with multiple inserts 162, each held in an insert recess 171. The insert recesses 171 are each provided with an insert securing device 171, in the embodiment shown in the form of a bolt engaging an opening in the side of the insert 162, the insert securing devices individually securing each insert in each insert recess. It is submitted that such a securing device limits the movement of the insert sufficiently to prevent the insert from falling out of the insert. However, the securing device allows for enough movement of the insert relative to the insert carrier to enable the insert to set relative to the insert carrier when loaded by the weight of a tubular, to thus prevent the weight of the product supported by the clamp from being transferred via the securing device instead of via the contact surfaces. Thus, the inserts can individually set to the tubular product supported by the clamp, which allows for an optimal transfer of the load from product to clamp, and thus a reduced wear of the inserts.

In the particular embodiment shown, the clamp part 108 is provided with an insert carrier securing device at the top end of the slot, for temporarily securing the insert carrier in the slot. In the embodiment shown, the insert carrier securing device is provided in the form of a pin that can be mounted in an opening of the clam part such that it engages a top end part of the insert carrier such that is blocks vertical movement of the insert carrier. By removing, or partially retracting said pin, the insert carrier 161 can be slid in a vertical upwards direction, out of the slot 172. In an embodiment, the insert carrier securing device blocks vertical movement of the insert carrier while allowing pivotable movement of the insert carrier about a longitudinal axis of the insert carrier.

In the exemplary embodiment shown, the slot 172 in each clamp part 108 has a semi-circular—or C-shaped—cross section, and the insert carrier 161, more in particular the body 170 of the insert carrier, has a section with a semi-circular cross section, which semi-circular section fits the slot 172. The semi-circular cross sections allow for the for the insert carrier 161 to pivot to a certain extent about its longitudinal axis. Thus, the insert carrier can set relative to the tubular held in the firing line. By thus allowing the insert carrier to correct for slight changes in position of the tubular product held in the firing line, the grip of the inserts onto said product is increased, and wear is reduced.

In the embodiment shown, the inserts 162 have a curved gripping surface 176. The gripping surface 176 preferably is shaped such that it substantially fits the circumference of a tubular to be supported by the product clamp. In the preferred embodiment shown, these inserts are combined with an insert carrier that can pivot about its longitudinal axis as described above.

The curved gripping surfaces of the inserts promote the inserts to position itself, by pivoting of the carrier body, relative to a tubular supported on the central axis of the product clamp, when the clamp engages the product. This positioning of the inserts by the pivoting of the insert carrier is enabled by the moveably mounted insert carrier. Thus, combining the pivotable supported insert carrier with inserts having a curved gripping surface further promotes the inserts of the clamp to set themselves relative to the tubular supported in the central axis of the product clamp, and enhances the grip of the clamp on the tubular product and reduces wear of the gripping surfaces.

The insert carrier 161 shown furthermore has a spherical bottom end 180, which spherical bottom end 180 is received in a corresponding recess provided at the bottom end of the slot 172 of the clamp part 108. Thus, the bottom end of the insert carrier is provided with large contact area, which is beneficial for the transfer of load forces from the insert carrier to the clamp part, and furthermore allows for the insert carrier to be pivotably mounted in the clamp part as described above.

In the embodiment shown, the tubular product clamp according to the invention, each of the clamping devices 104 is provided with a positioning device 140 for receiving and positioning a tubular product supported in the central product passage relative to the clamp part, when the clamp part is moved towards that tubular product. The positioning device 140 is similar in shape and function to the positioning device 40 discussed with respect to the clamping device shown in FIGS. 19-21. In both cases the positioning device is provided in the form of a V-shaped centering plate, more in particular a plate having a U-shaped recess, which is mounted at an angle to a plane perpendicular to the axis of the central product passage, such that one leg is located higher than the other leg, which allows for a wide receiving opening in combination with the clamp parts of the clamping devices to be positioned closely adjacent each other and close to the central axis of the product passage.

Thus, the positioning device can be embodied in a simple and robust form, which furthermore, allows the device to be provided as a replaceable insert. Furthermore, mounting the centering plates at an angle to a plane perpendicular to the axis of the central product passage enables a compact design of the product clamp.

The positioning device 140 differs from the one shown FIGS. 19-21 in that it is mounted on the clamp part 108 and not on the, removable, clamp block 61. It is submitted that in an alternative embodiment, the positioning device 140 is provided on the insert carrier, which, when the insert carrier is a pivotably mounted insert carrier as was described above, enable the positioning device to also position the inserts of the insert carrier, by pivoting the insert carrier, relative to the tubular.

The centering device 140 is provided in the form of an insert, i.e. a centering insert, which is removable mounted in a slot shaped recess provided on the clamp part, which slot shaped recess extends at an angle to a plane perpendicular to the axis of the central product passage.

A tubular product clamp according to the invention can be used for clamping tubular products, such as drilling pipes, casing, risers and to thus support for example a string of drilling pipes. Such clamps are typically used in the offshore industry.

The invention allows for a compact tubular product clamp, for example a product clamp having a height between 0.7 m and 1 m, for example having a height of 0.8 m, and having a diameter between 1.4 m and 2 m, for example having a diameter of 1.6 m, which product clamp has a central product passage of which the diameter can be changed in a range of for example 0.1 m, with the clamp parts in their most inward position, up to 0.5 m, with the clamp parts in their most outward position, i.e. their parking position. A clamp which such dimensions can be configured to interface with a rotary table.

The tubular product clamp, in particular the clamping device with the insert carrier, for clamping a tubular product e.g. a drilling pipe, has been described in detail with particular reference to certain preferred embodiments thereof, but it will be understood that variations and modifications can be effected within the scope of the system, especially to those skilled in the art. For example, a clamping device may be provided with three or more load transfer rollers, each with its own trajectory and parking position, and/or may be provided with multiple parallel mounted yokes at each side of the base part and clamping part, which yokes are pivotably mounted on a frame part or on a spacer arm, etc.

FIGS. 1-31 disclose product clamps in which a clamping device according to the invention can be used, i.e. a clamping device having a clamp part configured to support an insert carrier with one or more inserts, to provide a product clamp according to the invention. In particular, the clamp block 61 can be replaced with an insert carrier according to the invention, preferably in combination with providing the clamp part with a slot configured to pivotable support the insert carrier, as discussed with respect to FIGS. 32-35. It is submitted that an insert carrier according to the invention is advantageously used with a product clamp clamping device comprising a base part and a clamp part and one or more load rollers provided there between since this allows for a compact clamp design.

The tubular product clamps will be discussed in more detail below.

Figure 1:
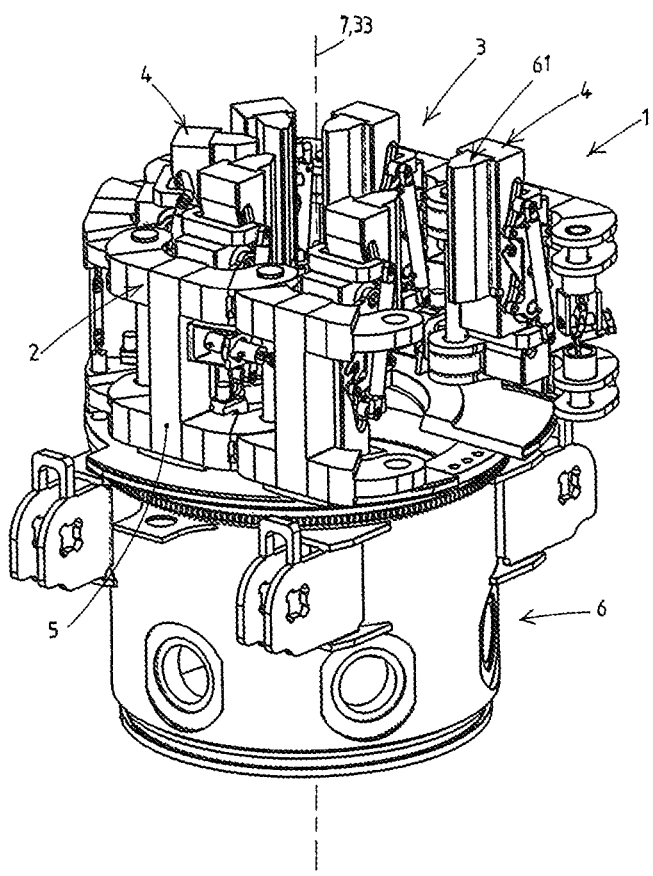
FIG. 1 shows a perspective view of a tubular product clamp for clamping a tubular product in an open configuration and mounted on a diverter.
Figure 2:
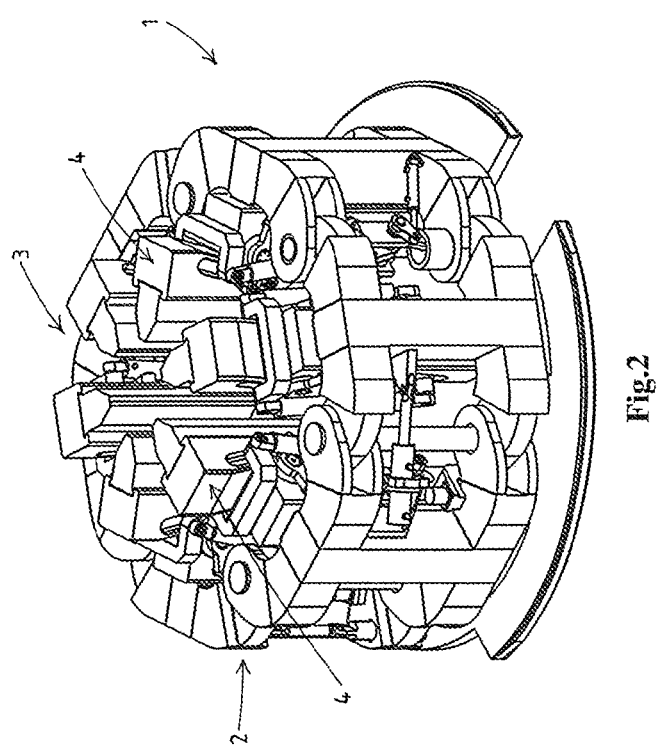
FIG. 2 shows a perspective view of the tubular product clamp of FIG. 1 in a closed configuration.
Figure 3:
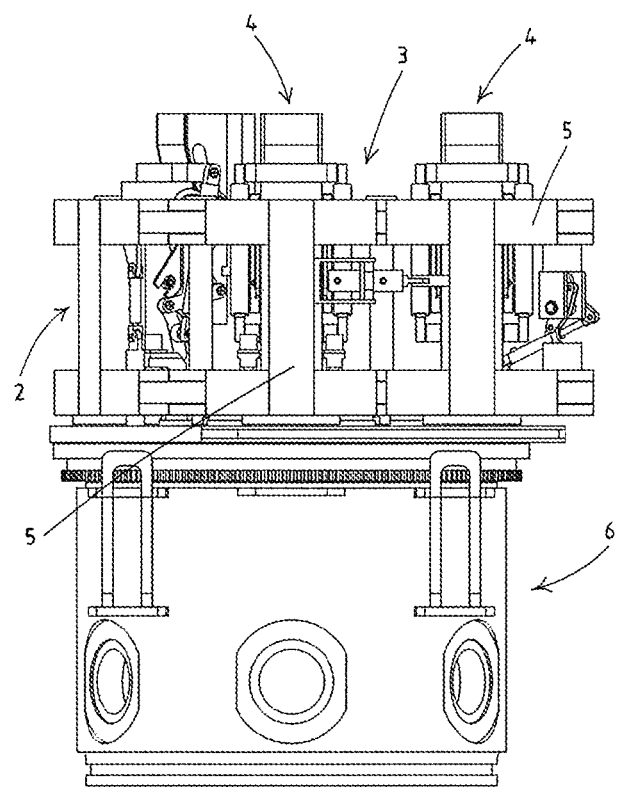
FIG. 3 shows a side view of the tubular product clamp and diverter of FIG. 1.
Figure 4:
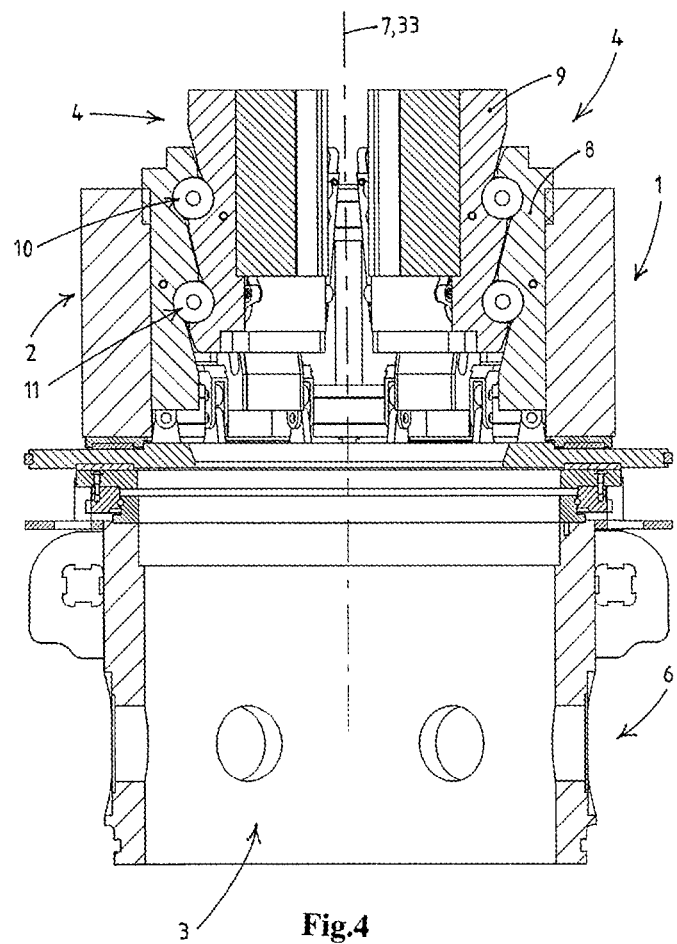
FIG. 4 shows a side view in cross section of the tubular product clamp and diverter of FIG. 1 with the product clamp in the closed configuration.

FIGS. 1 and 2 show a tubular product clamp 1 according to the invention. The tubular product clamp 1 is provided with a ring frame 2 extending around a central product passage 3 having an axis 33. According to the invention, and three or more, in the embodiment shown six, clamping devices 4 are provided at regular intervals along the inside of the ring frame, around the central passage 3.

In the particular embodiment shown, the ring frame 2 comprises multiple segments 5, two of which form a door that allows for opening the ring frame 2 for engaging a tubular. It is observed that the particular design of the ring frame is not essential for the invention. For example, the ring frame can comprises several segments linked together, with the clamping devices mounted to said segments, or for example be formed by linking the clamping devices to each other, etc.

FIG. 1 shows the product clamp 1 in an opened configuration while FIG. 2 shows the product clamp in a closed configuration.

In the opened configuration the clamp 1 can be moved into position while a tubular is supported in the firing line, or moved away from the firing line while a tubular is supported therein. Thus, by providing a door, the product clamp does not need to be taken apart for receiving a tubular in the lateral direction.

In FIG. 1 the tubular product clamp is mounted on a diverter 6. The diverter 6 is mounted in the deck of a drilling vessel (not shown). A firing line 7 extends through the centre of the diverter.

Figure 26:
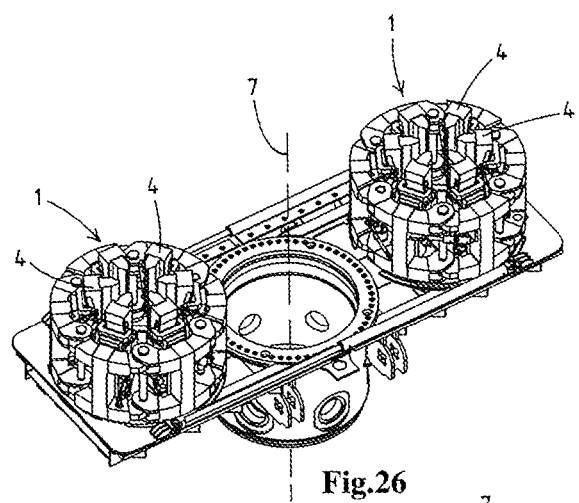
FIG. 26 shows two tubular product clamps according to the invention in a first set up.

FIG. 26 shows two product clamps 1 in a set up on a drilling vessel. In this set up, the two product clamps 1 are provided on opposite sides of a diverter 6. By providing two product clamps, one product clamp can be used as a back in case the other one fails or requires maintenance. The product clamps 1 are moveably supported, such that they can slide from an inactive position, in which they are depicted in FIG. 26, into an active positon, in which they are positioned above the diverter 6, to support a tubular in the firing line 7 extending through said diverter. As was set out above, the door provided in the ring frame allows for moving the product clamps 1 into and out of the active position while a tubular is already supported in the firing line.

Thus, for supporting a tubular product in the firing line, the ring frame 2 is opened and the tubular product clamp 1 is moved from its inactive position into its active position, thus aligning its central axis with the firing line and receiving the tubular product in its product passage. While the product clamp 1 is moved from its inactive towards its active position, the clam parts 9 of the clamping devices 4 are in their raised position, preferably in their parking position, to provide a wide central product passage 3 for receiving the tubular.

After the product clamp 1 has been positioned in its active position, i.e. with its axis coincides with the firing line, and the tubular product has been received in the product clamp, the ring frame 2 is closed and secured.

Subsequently, the clamp parts 9 of the clamping devices 4 are moved towards the tubular product until they engage the tubular product. In a preferred embodiment, the actuators press the clamp parts against the tubular product to provide an initial clamping force for clamping the tubular product.

Then, the tubular product can be lowered until it is fully supported by the tubular product clamp, in which condition the downward pull exerted by the tubular on the clamp parts is by the configuration of the product clamp converted into a clamping force.

Figure 27:
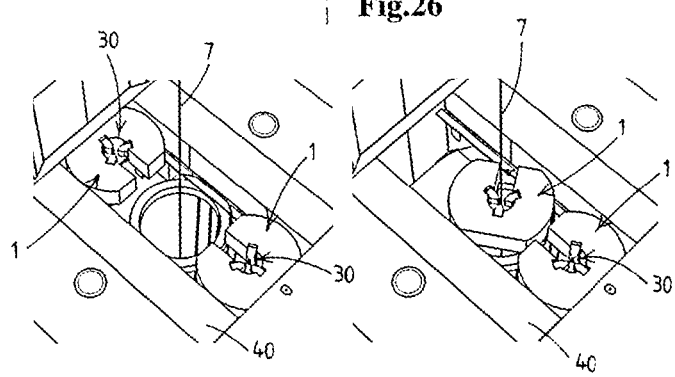
FIG. 27 schematically shows the set-up of FIG. 26 in two working positions.

FIG. 27 shows a further set-up of with two tubular product clamps 1, schematically depicted, in two working positions. In this set up, the product clamps are supported on a ring bearing when moved into their active position, which allows for rotating the product clamps, and thus the tubular product supported by the product clamp.

It is noted that the design of a product clamp according to the invention allows for a compact configuration of the product clamp, and thus facilitates providing applying the product clamp in set ups as shown in FIGS. 26 and 27, i.e. moveably supported on or recessed in the deck of a drilling vessel, and rotating the product clamp while supporting a tubular. In a preferred embodiment, the product clamp is configured to interface with a rotary table.

FIGS. 15-18 show another exemplary embodiment of a tubular product clamp 1. It is noted that components corresponding in terms or construction and/or function to components which have been described with reference to the tubular product clamp shown in FIGS. 1-4 are provided with the same reference numerals. It is furthermore submitted that the tubular product clamp shown in FIGS. 15-18 is substantially similar in design and function to the tubular product clamp shown in FIGS. 1-4. Here below the description will focus on the differences between the two shown clamping devices.

Figure 15:
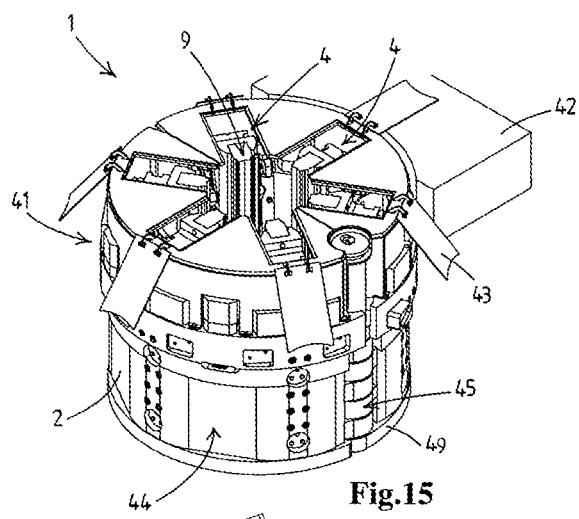
FIG. 15 shows a perspective view of another tubular product clamp.

The tubular product clamp 1 shown in FIG. 15 differs from the one shown in FIG. 1 in that the product clamp shown 1 in FIG. 15 is provided with a top housing 41, which top housing 41 defines a clamp part receiving space 60 for receiving the clamp parts 9 of the product clamp when in their raised position. FIG. 17 shows the product clamp 1 of FIG. 15 in cross section with the clamp parts 9 in their fully lower position, while FIG. 18 shows the same product clamp 1 with the clamp parts in their raise position, which in the particular embodiment shown is also a parking position. In the raised position, the clamp parts 9 extend upward from the product clamp 1, and in the embodiment shown are received in the clam part receiving space 60 defined by the top housing 41. Thus, the top housing shields the product clamp, in particular the clamp parts of the clamping devices of the product clamp from above. Furthermore, in the embodiment shown it provides a working surface for personnel.

Furthermore, in the preferred embodiment shown, the product clamp 1 recessed in a deck 42 of a drilling vessel, part of which deck is shown in FIG. 15, such that the top surface of the top housing 41 is substantially flush with the deck surface of that drilling vessel. Thus, the top housing extends the working surface of the personnel up to the area above the product clamp.

In the preferred embodiment shown, the top housing 41 is provided with hatches 43 to provide access to the individual clamping devices 4, more in particular to the clamp parts 9 of the clamping devices. The hatches 43 are depicted open in FIG. 15 and are depicted closed in FIG. 16

In the preferred embodiment shown, the top housing 41 is releasable attached to the product clamp 1, such that it can be removed if required, for example to facilitate maintenance and/or inspection of the clamping devices 4 of the product clamp 1

The tubular product clamp shown in FIG. 15 furthermore differs from the one shown in FIG. 1 in that the load transfer rollers 10,11 are provided with a circumferential guide rib 46 located at the centre of each load transfer roller 10,11. The base part 8 and the clamp part 9 are provided with guide grooves 47 for cooperating with a corresponding circumferential guide rib 46, which guide grooves are provided in the guide surfaces 17, 23 of the base parts 8 and the clamp parts 9 of the clamping devices 4. Part of the circumferential guide ribs 46 and part of the guide grooves 47 are depicted in the cross sectional view of FIG. 17. The load transfer rollers 10,11 of the clamping device 4 shown in in FIGS. 5-14 are provided with multiple circumferential guide ribs 46, more in particular with one circumferential guide rib 46 at each end of the load transfer rollers 10,11. In alternative embodiments, the load transfer rollers may be provided with three or more circumferential guide ribs.

Figure 16:
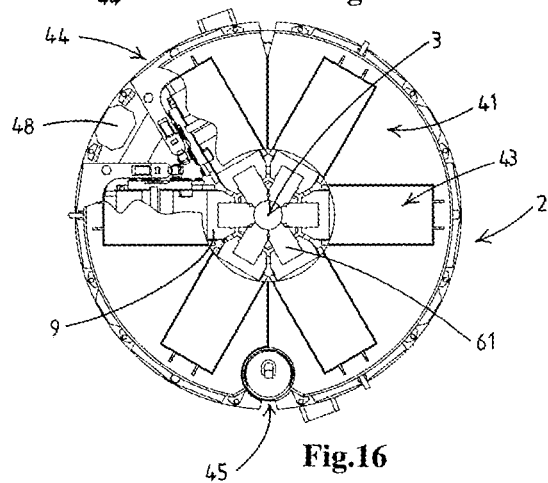
FIG. 16 shows a top view of the tubular product clamp of FIG. 15.

The tubular product clamp shown in FIG. 15 furthermore differs from the one shown in FIG. 1 in that the ring frame 2 of the tubular product clamp 1 is supported on three load sensors 48, one of which is shown in FIG. 16. Furthermore, in the preferred embodiment shown, these sensors 48 are resilient mounted load sensors provided between the ring frame 2 and a base plate 49 configured for supporting the ring frame. Thus, when the resilient supported load sensors 48 are compressed to a certain extent, sections of the ring frame 4, not shown in the Fig., land on the base plate 49, such that the ring frame is supported by the base plate. Thus, the sensors 48 only monitor a lower section of the working range of the tubular product clamp. Due to the limited working range, the sensors can be used that more accurately monitor the loads in this particular range. Furthermore, since the sensors do not need to carry the load of the clamp when at its upper end of its working range, more delicate and more simple sensors can be used.

Furthermore, in the preferred embodiment shown the sensors 48 are coupled with a control system that is linked to actuators 48 for moving the clamp parts 9. The control system is configured to block movement of the clamp parts of the clamping devices in a direction away from the tubular when they are supporting a load. Thus, the clamp parts can only be moved away from the tubular when that tubular is supported by an external device, for example a crane or trolley mounted on a derrick, in such a way that the tubular is not supported by the clamp. Therefore, there is no risk of the tubular falling from the clamp when the clamp parts are moved.

The tubular product clamp shown in FIG. 15 furthermore differs from the one shown in FIG. 1 in that the ring frame 2 comprises two C-shaped ring sections 44, each supporting multiple, more in particular three, clamping devices 4, which in combination form the ring frame 2. The C-shaped ring sections 44 are at one end hingeable connected such that they can be pivoted relative to each other between an open configuration for receiving a tubular, which configuration is shown in top view in FIG. 33 while receiving a tubular 63, and a closed configuration for holding a tubular, which configuration is shown in top view in FIG. 16. It is noted that in FIG. 16 the clamp parts are moved into their inward position, and in FIG. 33 the clamp parts are moved into their parking position, and therefore are not visible. Opposite the hinge, the ring frame 2 is provided with a locking device in the form of a moveable locking pin is provided to secure the two C-shaped ring sections relative to each other.

FIG. 22 shows left side view of an exemplary embodiment of a clamping device 4 for use in a tubular product clamp, for example a tubular product clamp as is shown in FIG. 1 or the product clamp shown in FIG. 15. It is noted that components corresponding in terms or construction and/or function to components which have been described with reference to FIG. 1 are provided with the same reference numerals.

The clamping device 4 comprises a base part 8, a clamp part 9 two load transfer rollers 10, 11, a trolley frame 12, a yoke 13 and an actuator 14.

The base part 8, has a back side 15 configured to be mounted to the ring frame 2, a front side 16 that defines a guide surface 17 facing towards the central tubular product passage 3, and a left side 18 and a right side 19 (not visible in the figure) provided with cam tracks. The cam tracks extend substantially parallel to the guide surface 17 defined by the front side 16 of the base part 8.

The clamp part 9 has a back side 22 that defines a guide surface 23 facing the guide surface 17 defined by the front side of the base part, a front side 24 facing the central product passage 3, and a left side 25 and a right side provided with cam tracks, of which the cam track 27 provided on the left side is visible in the figure. The cam tracks extend substantially parallel to the guide surface 23 defined by the back side 22 of the clamp part 9. The two load transfer rollers 10,11 are each provided between the guide surface 17 of the base part 8 and the guide surface 23 of the clamp part 9 to provide a rolling support for the clamp part.

The trolley frame 12 is configured for positioning the base part 8, the clamp part 9 and the load transfer rollers 10,11 relative to each other. The trolley frame has a left side frame part 29 (visible in the fig) on the left side of the clamp part 9 and the base part 8 and a right side frame part on the right side of the clamp part and the base part. The left side frame part and right side frame part carry the two load transfer rollers 10,11 between them, which load transfer rollers are each rotatably mounted in said frame parts.

The left frame part 29 and the right frame part are each provided with cam followers 31 with which cam followers the frame parts engage the cam tracks 20,27 in the sides of the base part 8 and the clamp part 9.

It is noted that in the particular embodiment shown, the trolley frame 12 is configured such that a straight line can be drawn through each cam follower 31 for engaging the cam tracks 20 on the base part 8, a central rotational axis of one of the load transfer rollers 11 and a cam follower 31 for engaging the cam tracks 27 on the clamp part 9. The left frame part 29 and the right frame part 30 are each H-shaped, the H-shaped frame parts each having a central leg extending along the guide tracks for the load transfer rollers 10,11 defined by the guide surfaces 17, 23 of the base part and the clamp part.

The yoke 13 is configured for positioning the trolley frame 12 relative to the base part 8 and the clamp part 9 while the base part is moved relative to the base part. The yoke 13 is at a central part thereof pivotably mounted on the trolley frame 12, and is at opposite ends thereof provided with slots 34, one slot engaging a pivot on the base part 8 and the other slot engaging a pivot on the clamp part 9.

The guide surface 17 of the base part 8 and the guide surface 23 of the clamp part 9 define between them a guide track 35 for each of the load transfer rollers 10, 11. In the exemplary embodiment shown, these guide tracks are integrated into a single guide track. In an alternative embodiment, the load transfer rollers are each provided with a guide track, which guide tracks are preferably similar in form.

The guide tracks 35 extends at an angle with the axis 33 of the central product passage 3 such that by moving the clamp part 9 relative to the base part 8, the clamp part is moved along the axis as well as in radial direction thereof.

The load transfer rollers provide a rolling support of the clamp part, such that the clamp part can be moved relative to the base part. In the embodiment shown in FIGS. 22-25, the clamping device 1 is provided with an actuator 36 for moving the clamp part. Thus, the product clamp is actuator controlled. Alternatively, the clamp part is configured to be moved by manpower, for example is provided with a grip at its top side for engagement by hand or by a manual operated lifting device, for lifting the clamp part. In an embodiment, the clamp part is configured for engagement by an external lifting device such as a crane provided on the deck or a winch provided in a drilling mast.

In the exemplary embodiment shown however, the clamping device is provided with an actuator 36, which actuator comprises two hydraulic cylinders, one 37 on the left side of the base part and clamp part, and one (not visible in the Fig.) on the right side of the base part and clamp part. The hydraulic cylinders are with one end connected to the base part 8 and with one end to the trolley frame 12. By connecting the other end of the actuators to the trolley frame 12 and not to the clamp part 9, the length of the cylinder can be kept small, since the travel trajectory of the frame is half or the travel trajectory of the clamp part. In an alternative embodiment, the actuator comprises cylinders which are with one end connected to the base part and with an opposite end to the clamp part. In such an embodiment, the cylinder engages the clamp part directly, instead of via the trolley frame. Thus, the lifting forces exerted by the cylinders are enacted directly onto the clamp part are not transferred via the trolley frame. Thus, the trolley frame and its connections to the base part and clamp part can be kept comparatively light and small.

FIGS. 23-25 show the clamp part 9 in different positions relative to the base part 8. In the figures, the actuators and the trolley frame have been omitted for the sake of clarity. The figures clearly show that the load transfer rollers 10,11 move along the guide surfaces 17,23 of the clamp part 9 and the base part 8 when the first is moved relative to the other. Furthermore, the figures clearly show that the yoke 13 functions as a regulator, which determines the position of the trolley frame 12, and thus of the load transfer rollers 10, 11 carried by that trolley frame, relative to the clamp part 9 and the base part 8, when the clamp part 9 is moved relative to the base part 8.

Figure 5:
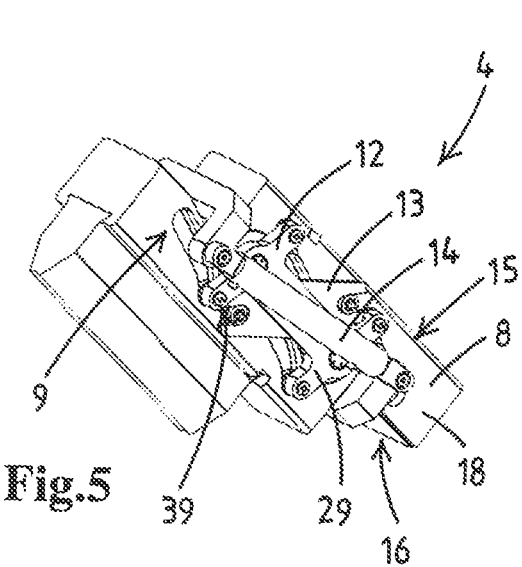
FIG. 5 shows a perspective view of a clamping device of the tubular product clamp of FIG. 1 in a first position.
Figure 6:
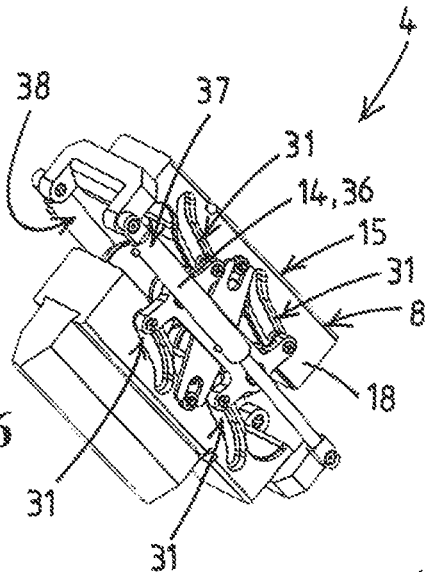
FIG. 6 shows a perspective view of the clamping device of the tubular product clamp of FIG. 5 in a second position.

FIGS. 5 and 6 show a perspective view of an alternative clamping device, used in the tubular product clamp shown in the FIGS. 1-4. The components of this clamping device corresponding in terms or construction and/or function to components which have been described with reference to FIGS. 22-25 are provided with the same reference numerals.

FIG. 5 shows the clamping device 1 with the clamp part 9 in a raised or retracted position. FIG. 6 shows the same device 1 with the clamp 8 part in a lowered or extended position. When the clamp part 9 is in the lowered position shown in FIG. 6, the hydraulic cylinders 37,38 of the actuator 36 are extended. When the clamp part is lifted by the actuator, for example to release a tubular held in the tubular product passage, the hydraulic cylinders 37,38 of the actuator 36 are retracted.

By lifting the clamp parts 9 of the clamping devices of the tubular product clamp, the clamp parts are also moved in the radially outward direction. Thus, the central product passage is opened up, which for example allows for passing the collar of a tubular through said passage.

Figure 7:
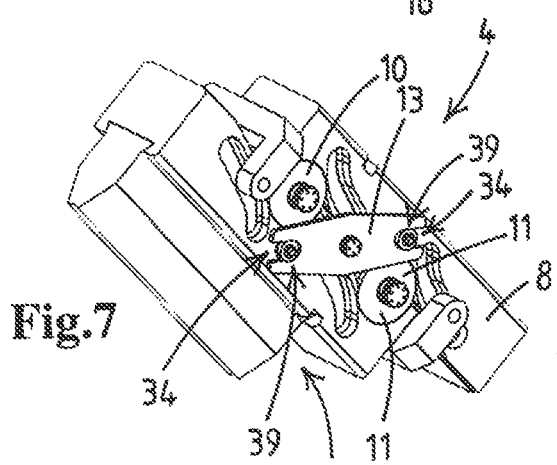
FIG. 7 shows a perspective view of the clamping device of FIG. 5 with some parts removed.

It is observed that the exemplary embodiment of the clamping device shown in FIGS. 5-7 differs from the one shown in FIGS. 22-25 in that the hydraulic cylinders 37,38 of the actuator 36 are with one end connected to the base part 8 and with an opposite end to the clamp part 9. In such an embodiment, the cylinder engages the clamp part directly, instead of via the trolley frame. Thus, the lifting forces exerted by the cylinders are enacted directly onto the clamp part are not transferred via the trolley frame. Thus, the trolley frame and its connections to the base part and clamp part can be kept comparatively light and small.

Figure 8:
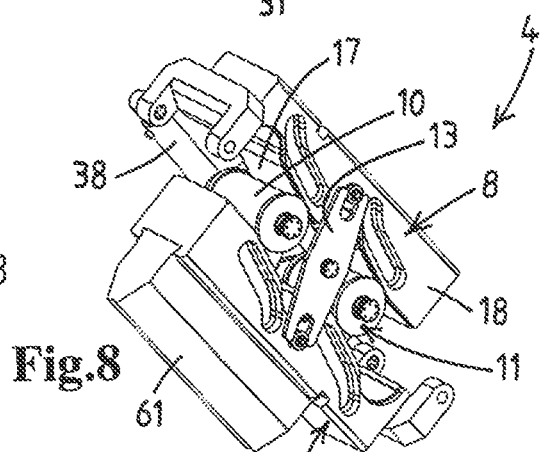
FIG. 8 shows a perspective view of the clamping device of FIG. 6 with some parts removed.

FIGS. 7 and 8 depict the clamping devices as shown in FIGS. 5 and 6 in the same position but with the left hydraulic cylinder 37 of the actuator 36 and the left part of the trolley frame 12 removed to clearly show the position of the yoke 13 and load transfer rollers 10,11.

The yoke 13 is at opposite ends provided with a slot 34, in each of which pivot notch 39 is received such that the slot is at one end slideable connected to the base part 8 and at an opposite end slideable connected to the clamp part 9. The yoke 13 is at its centre pivotable connected to the trolley frame 12.

It is observed that the exemplary embodiment of the clamping device shown in FIGS. 5-7 differs from the one shown in FIGS. 22-25 in that the yoke is pivotally, at its centre, mounted on the trolley frame at a central part thereof and not on an arm of the trolley frame extending along the roller track, i.e. the guide track for the load transfer rollers defined by the guide surfaces of the base part and the clamp part. Furthermore, the slots provided at the opposite ends of the yoke are open slots, thus reducing the length of the yoke. Thus, the trolley frame as well as the yoke can be kept compact, which facilitates mounting the hydraulic cylinders on the clamp part in stead off on the trolley frame.

Figure 9:
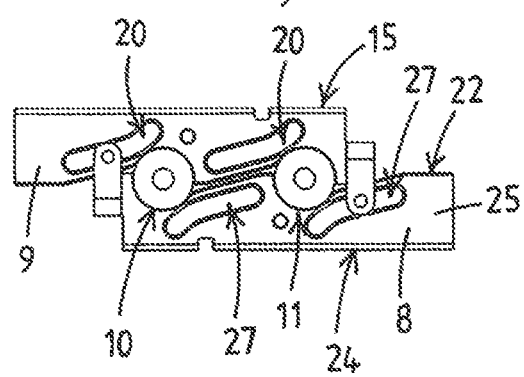
FIG. 9 shows a side view of some parts of the clamping device of FIG. 5.
Figure 10:
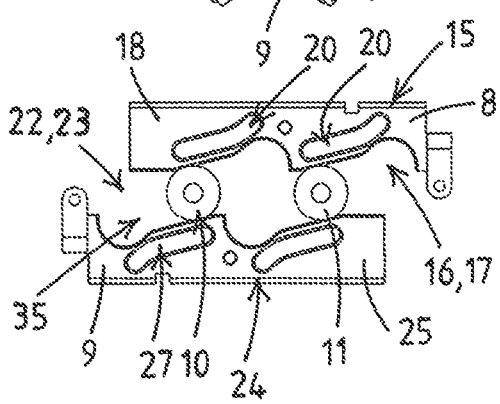
FIG. 10 shows a side view of some parts of the clamping device of FIG. 6.
Figure 11:
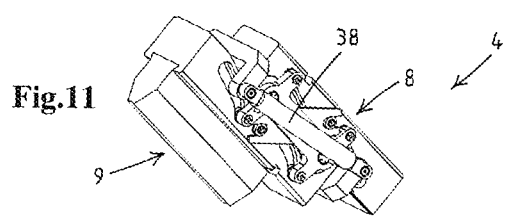
FIG. 11 shows a perspective view of a clamping device of the tubular product clamp of FIG. 1, similar to FIG. 5.
Figure 12:
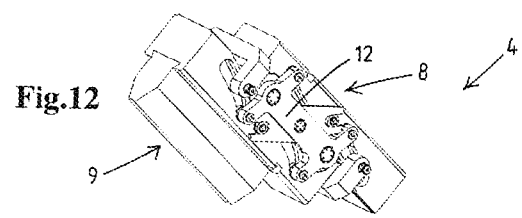
FIG. 12 shows a perspective view of the clamping device of FIG. 11 with a part removed.
Figure 13:
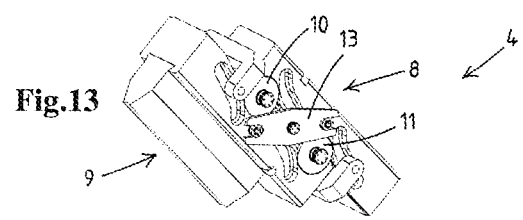
FIG. 13 shows a perspective view of the clamping device of FIG. 12 with an additional part removed, similar to FIG. 7.
Figure 14:
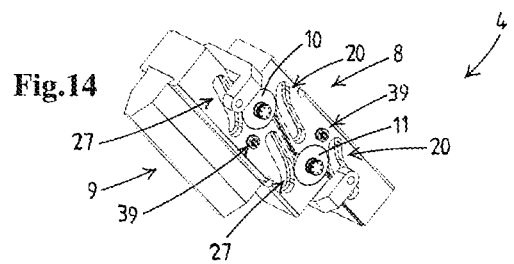
FIG. 14 shows a perspective view of the clamping device of FIG. 13 with an additional part removed.

FIGS. 9 and 10 depict in side view the base part 8, clamp part 9 and the load transfer rollers 10,11, provided between the guide surfaces of the base part 8 and the clamp part 9, of the clamping devices shown in FIGS. 5 and 6 in the same position. The figures thus clearly show the contour of the guide surfaces, and the cam tracks extending substantially parallel to those guide surfaces, more in particular to the contour of those guide surfaces.

It is observed that the exemplary embodiment of the clamping device shown in FIGS. 5-7 differs from the one shown in FIGS. 22-25 in that the load transfer rollers 10,11 are each provided with a transfer track, which two tracks are defined by the guide surfaces of the base part and the clamp part, which transfer tracks are similar shaped.

Furthermore, each side of the clamp part and the base part is provided with two cam tracks, one for each cam track and each cam track extending substantially parallel to those guide surfaces, more in particular to the contour of those guide surfaces.

In the embodiment shown in FIGS. 22-25 the guide surfaces also define a cam track for each load transfer roller, the guide tracks however combine into a single guide track, as do the cam tracks. Thus, the load transfer rollers can share a guide track. The overlapping guide tracks may provide an extended trajectory for moving the clamp part relative to the base part.

The guide surface of the clamping device shown in FIGS. 9 and 10 furthermore differ from the ones shown in FIGS. 22-25 in that they define a parking position in the form of a recess at the end of the guide surfaces, and thus at the end of the guide tracks which curve in a radially outward direction at their upper ends to provide the clamp part with a parking positon. In FIG. 9, the clamp part is shown in its lifted position and with the load transfer rollers received in the parking position. Proving these recesses in which the load transfer rollers are received allows for moving the clamp part closely adjacent the base part, and thus for a compact configuration of the clamping device when in the retracted or lofted position. This in turn provides an extra wide central product passage and thus facilitates passing products there through and thus reduces the need of removing the tubular product clamp when passing products with a wide diameter along the firing line and through the product passage.

FIG. 19-21 show another exemplary embodiment of a clamping device 4 for use in a tubular product clamp, for example a tubular product clamp as is shown in FIG. 1 or a product clamp as is shown in FIG. 15. It is noted that components corresponding in terms or construction and/or function to components which have been described with reference to FIGS. 1-18 are provided with the same reference numerals.

It is submitted that the clamping device shown in FIGS. 19-21 is substantially similar in design and function to the clamping device shown in FIGS. 5-14. Here below the description will focus on the differences between the two clamping devices.

The clamping device shown in FIGS. 19-21 differs from the one shown in FIGS. 5-14 in that the cam tracks 21 provided on the base part and the cam tracks 28 provided on the clamp part have an open end. It is noted that the movement of the cam followers, or cams in short, in the respective cam tracks is restricted by the trolley frame 12 and yoke 13 such that the cams, cannot run out of the cam tracks, which is shown FIG. 19. The cam tracks not ending in the base part and the clamp part does however allow for a more compact base part and clamp part, which in turn allows for a more compact clamping device and thus for a more compact product clamp. It is noted that in an alternative embodiment, one or both cam tracks of only the base part or the one or both cam tracks of only the clamp part do not end in the base part or the clamp part respectively.

The clamping device shown in FIGS. 19-21 further differs from the one shown in FIGS. 5-14 in that the clamping device 4 is provided with a positioning device 40 for receiving and positioning a tubular product relative to the clamp part 9 when the clamp part 9 is moved towards a tubular product supported in the central product passage. The clamping device comprises two guide legs which extend at an angle to each other, such that they define a V-shape when seen in a direction along the axis of the central product passage. In the preferred embodiment shown two guide legs of the clamping device 40 are furthermore staggered relative to each other along the axis of the central product passage, which enables the guide legs of two adjacent guiding devices to overlap when the clamp parts are moved towards the central axis, which has been depicted in the side view in cross section shown in FIG. 17.

It is noted that in the embodiment shown, In an embodiment, the positioning device 40 is provide in the form of a V-shaped centering plate which is mounted at an angle to a plane perpendicular to the axis of the central product passage, such that one leg is located higher than the other leg. In an alternative embodiment, for example the two guide legs can be separate components mounted on the clamp part of the clamping device.

In an embodiment of a product clamp, the base part and or the clamp part of the clamping devices are composed from different components. For example they can each comprises a frame shaped body supporting a solid track element, which solid track element is a steel body that defines the guide surface and for example is a track element made as a unitary body of high grade steel. Such an embodiment may allow for replacement of part of the base part or clamp part. For example in case of wear of the track surface defined by the base part, only the track element needs has to be replaced.

Figure 28:
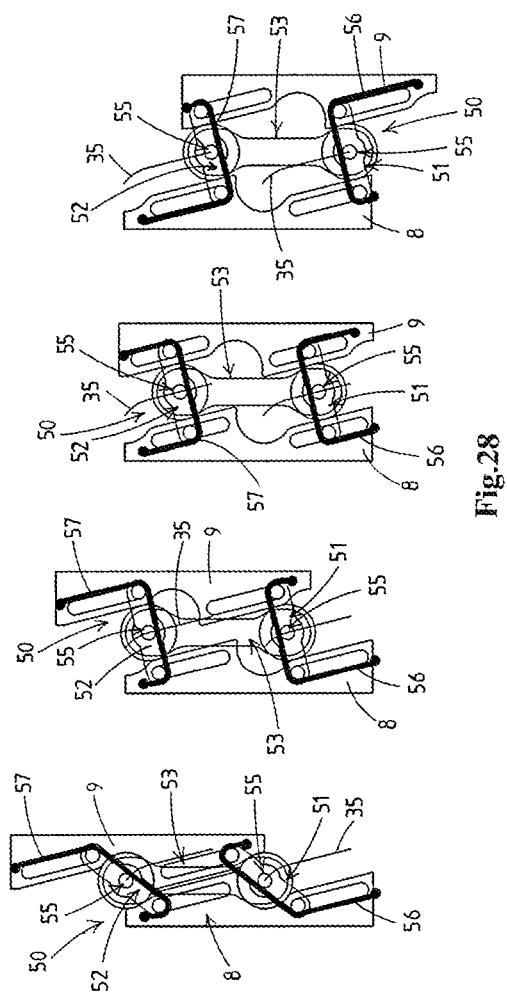
FIG. 28 schematically shows, partially in see through, a part of a clamping device provided with a rack and pinion mechanism in four working positions.

FIG. 28 schematically shows part of a clamping device provided with a rack and pinion mechanism in four working positions. It is noted that components corresponding in terms or construction and/or function to components which have been described with reference to the clamping device shown in FIGS. 5-14 are provided with the same reference numerals. It is furthermore submitted that the clamping device 4 shown in FIG. 28 is in its overall function substantially similar in design and function to the clamping device shown in FIGS. 5-14. Here below the description will mainly focus on the differences between the two shown clamping devices.

FIG. 28 the clamping device 4 in four working positions. On the left side the clamp part 8 of the clamping device 8 is located in its lower, most inward, clamping position. On the right side, the clamp part 8 of the clamping device 4 is raised in its most upper positon, which is also a parking position, i.e. in this position the load transfer rollers 10,11 are received in a recess defined by the guide surfaces 17,23 of the base part 8 and the clamp part 9. Between these the left side and the right side figures, the clamping device 4 is shown with its clamp part 8 in tow intermediate positions.

The clamping device 4 schematically depicted in FIG. 28 differs from the clamping device 4 shown in FIGS. 5-14 in that the load transfer roller tracks, defined by the guide surfaces 17,23 of the base part 8 and the clamp part 9, have a curved end sections that provide a parking position for the load transfer roller 10,11, depicted in the right hand fig., while the cam tracks 21,28 have no such curved end sections. This is made possible by providing the trolley frame 50 with retainer arms 51,52 that can pivot relative to each other.

Thus, the clamping device 4 schematically depicted in FIG. 28 furthermore differs from the clamping device 4 shown in FIGS. 5-14 in that the trolley frame 50 of the clamping device has a lower retainer arm (not visible in the Fig.) and an upper retainer arm (not visible in the Fig.) on the left side of the clamp part 9 and the base part 8 and a lower retainer arm 51 and an upper retainer arm 52 on the right side of the clamp part 9 and the base part 8. In this embodiment, one load transfer roller 10 is carried between the left lower retainer arm and the right lower retainer arm 51 and one load transfer roller 11 is carried between the left upper retainer arm and the right upper retainer arm 52. The load transfer rollers 10,11 are each rotatably mounted.

Furthermore, each of the retainer arms 51,52 has a cam follower 32 at one end for engaging one of the cam tracks provided on the base part 21 and a cam follower 32 at an opposite end for engaging one of the cam tracks provided on the clamp part 28.

Thus, the trolley frame 50 comprises two retainer arms 51,52 on each side of the clamping device 4, each arm positioning the clamp part 9 relative to the base part 8 and correctly positioning the load transfer roller 10,11 between the clamp part and the base part. In combination, the lower and upper retainer arm furthermore prevent pivoting of the clamp part relative to the base part.

Providing separate retainer arms instead of a single frame part allows for the retainer arms to move relative to each other, and thus to pivot relative to the clamping device (compare the position of the retainer arms in the outer figures with position of the retainer arms in the two middle figures). Thus, in the parking position, the clamp part 9 can be positioned even closer to the base part 8 when compared with a single peace, rigid frame part.

Figures 30, 31:
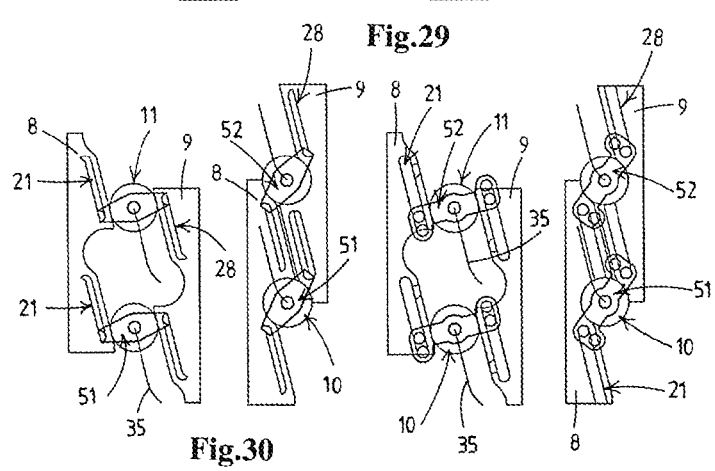
FIG. 30 schematically shows, partially in see through, a part of a clamping device provided with an alternative cam track in two working positions.
FIG. 31 schematically shows part of a clamping device provided with a further alternative cam track in two working positions.

FIGS. 30 and 31 schematically shows part of further embodiments of a clamping device, provided with alternative cam tracks, in two working positions. Also in these embodiments, the trolley frame 50 is provided with retainer arms 51,52 which, when the load transfer rollers are moved into their parking position, shown in the respective right hand Figs., pivot relative to the clamping device. In these embodiments, the cam followers, or cams 31,32, provided on the opposite ends of the retainer arms are configured such that they, in cooperation with the cam tracks, prevent the retainer arms from pivoting. The cam tracks are at one end provided with a curved outward section or with a bifurcation for receiving the cam followers, and which allow for the retainer arms to pivot relative to the clamping device when at the end of the cam track, such that the load transfer roller carried by the retainer arms curves into its parking position. In the figures furthermore has been indicated an imaginary guide track 35 for each of the load transfer rollers 10, 11, defined by the guide surface of the base part 8 and the guide surface of the clamp part 9, which guide track the load transfer roller follow when the clamp part is moved relative to the base part. Thus, the load transfer rollers can be moved along these guide tracks between their most radially inward position, for clamping tubular products with a small diameter, and their most radially outward position, which may be a parking position, to enable products to be moved through the product passage along the axis of the tubular product clamp.

The clamping device 4 schematically depicted in FIG. 28 furthermore differs from the clamping device 4 shown in FIGS. 5-14 in that the trolley frame further has at least one spacer arm 53 which spacer arm is with one end rotationally connected to one of the two load transfer rollers 10, in the particular embodiment shown to an axle of the roller body 10, and with its opposite end to the other one of the two load transfer rollers 11, in the embodiment shown to an axle of the roller body 11. Thus the trolley frame 50, more in particular the spacer arm 53 of the trolley frame also positions the two load transfer rollers 10,11 relative to each other.

In the embodiment depicted, a single spacer arm 53 is provided at the centre of the clamping device 4, and engages a mid-section of the load transfer rollers 10,11.

In an alternative embodiment of a tubular product clamp the trolley frame has a spacer arm on the left side of the clamp part and the base part and a spacer arm on the right side of the clamp part and the base part, which left side spacer arm is preferably with one end rotationally connected to the left side lower retainer arm and with an opposite end rotationally connected to the left side upper retainer arm, and which right side spacer arm is preferably with one end rotationally connected to the right side lower retainer arm and with an opposite end rotationally connected to the right side upper retainer arm. In a further preferred embodiment, both the spacer arms and the retainer arms are rotationally connected to the load transfer rollers, preferably to an axle of the load transfer roller, such that the load transfer bodies are coaxially and rotatably mounted in both the retainer arms and the spacer arms.

The clamping device 4 schematically depicted in FIG. 28 furthermore differs from the clamping device 4 shown in FIGS. 5-14 in that the clamping device 4 comprises a rack and pinion mechanism 54, which rack and pinion mechanism is provided between the respective load transfer rollers 10, 11 on the one hand and the base part 8 and the clamp part 9 on the other hand, to position the load transfer rollers relative to the base part and the clamp part while the clamp part is moved relative to the base part.

In the particular embodiment shown, the rack and pinion mechanism 54 comprises a left side sprocket wheel and a right side sprocket wheel 55 mounted on opposite ends of each load transfer roller 10,11 respectively, which sprocket wheels are mounted on an axle end of the transfer rollers.

The rack and pinion mechanism 54 further comprises a lower chain and an upper chain on the left side of the clamp part and the base part and a lower chain 56 and an upper chain 57 on the right side of the clamp part and the base part (in FIG. 28 only the right side of the clamping device 4 is shown), which chains are each with one end connected to the base part 8 and with another end connected to the clamp part 9, and which chains each extend along a substantially U-shaped trajectory. The lower chain 56 extends along a U-shaped trajectory of which the legs point in the downward direction, and the upper chain 57 extends along a U-shaped trajectory of which the legs point in the upward direction.

The sprocket wheels 55 of one of the two load transfer rollers engage the left lower chain and the right lower chain and the sprocket wheels of the other load transfer roller engage the left upper chain and the right upper chain, such that when the when the clamp part is moved relative to the base part the chains are pulled along the sprocket wheels. Thus, the movement of the load transfer wheels is controlled, and slippage is prevented.

In an alternative embodiment of a tubular product clamp each clamping device further comprises a yoke, which yoke is configured for positioning the spacer arm relative to the base part and the clamp part while the clamp part is moved relative to the base part, which yoke is at a central part thereof pivotable mounted on the spacer arm, and is at opposite ends thereof provided with slots, one slot engaging a pivot on the base part and the other slot engaging a pivot on the clamp part.

Figure 29:
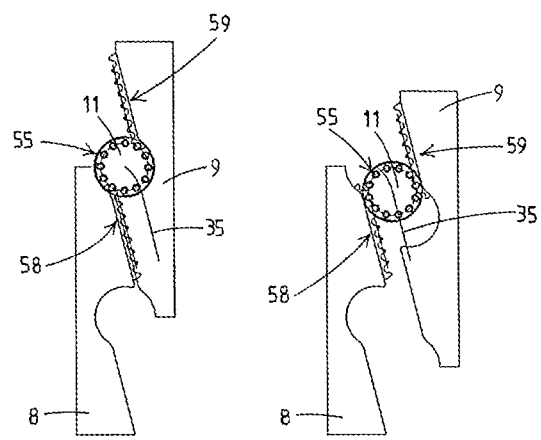
FIG. 29 schematically shows part of a clamping device provided with an alternative rack and pinion mechanism in a first and a second working position.

FIG. 29 schematically shows part of a clamping device provided with an alternative rack and pinion mechanism in a first and a second working position. In this embodiment, the rack and pinion mechanism 54 comprises a rack 58 provided on the base part 8 and a rack 59 provided on the clamp part 9. The rack and pinion mechanism further comprises a sprocket wheel 55 mounted on an axis of the load transfer roller, which sprocket wheel engages both racks, such that when the clamp part is moved relative to the base part the sprocket wheel runs along the sprocket wheel. Thus, the movement of the load transfer wheels is controlled, and slippage is prevented. In the figures furthermore has been indicated an imaginary guide track 35 for the load transfer roller 11, defined by the guide surface of the base part 8 and the guide surface of the clamp part 9, which guide track the load transfer roller follows when the clamp part is moved relative to the base part.

The clamping devices 4 shown in FIGS. 5 and 21 have a clamp part 9 that is configured for supporting a clamp block 61, for example in the form of a polyurethane body or dedicated steel body, for engaging the tubular body to be held by the clamp 1. The clamp blocks 61 form the interface between the clamp part 9 and the tubular held by the clamp part. In the preferred embodiments shown, the clamp blocks 61 are mounted to the clamp parts 9 in a way that facilitates replacement, without the need of disassembling the clamp or parts thereof. The clamp parts 9 and the clamp blocks 61 are configured such that the clamp blocks can be slid, from above, into a slot provided in the clamp parts 9 to allow for easy removal. It is noted that, since the load of a tubular product support by the clamp is directed in the downward direction, the clamp block are held in position by a tubular supported by the clamp. In addition, the clamp blocks can be secured using for example bolts or pins in the slot.

The invention claimed is:

1. A tubular product clamp for supporting a tubular product in a firing line of a drilling rig, the product clamp having a ring frame with three or more clamping devices, which clamping devices are provided at regular intervals along the inside of the ring frame around a central product passage having a central axis, and wherein each clamping device comprises:
   a base part mounted to the ring frame, the base part having a front side that defines a guide surface facing towards the central product passage; and
   a clamp part having a back side that defines a guide surface facing the guide surface defined by the front side of the base part, and a front side facing the central product passage,
   wherein the guide surfaces of the base part and the clamp part define a guide track for guiding the clamp part relative to the base part,
   wherein the guide surfaces, and thus the tracks defined by the guide surfaces, extend at an angle with the central axis of the product passage of the ring frame of the product clamp, such that by moving the clamp part relative to the base part along the guide track, the clamp part is moved along the central axis of the product passage of the ring frame of the product clamp as well as in radial direction thereof,
   wherein the tubular product clamp further comprises an insert carrier for each clamp part having an insert carrier body with one or more recesses for holding one or more inserts for engaging the tubular product supported by the product clamp,
   wherein each clamp part is in a front surface thereof provided with a slot for supporting the insert carrier, the slot extending in a direction parallel to the central axis of the product passage of the ring frame of the product clamp and having an open top end for receiving the insert carrier, such that the insert carrier can be slid onto the clamp part in a downward direction substantially parallel to the central axis of the product passage of the ring frame of the product clamp, and the slot being open towards the central product passage for holding the insert carrier body in the slot with the one or more inserts facing the facing the central axis of the product passage of the ring frame of the product clamp, and
   wherein the slot in each clamp part has a semi-circular cross section, and the body of the insert carrier has a section with a semi-circular cross section, which semi-circular section of the body of the insert carrier is received in the slot such that the clamp part allows for the insert carrier to pivot to a certain extent about its longitudinal axis.

2. The tubular product clamp according to claim 1, wherein each insert carrier is provided with multiple insert recesses, each recess holding an insert, and wherein the inserts and the recesses have a contact surface that runs substantially parallel to the guide surfaces of the clamp part and the base part for directing a load of a tubular supported by the product clamp towards the clamp part.

3. The tubular product clamp according to claim 1, wherein each insert recess is provided with an insert securing device, the insert securing devices individually securing each insert in each insert recess.

4. The tubular product clamp according to claim 1, wherein the angle of the guide surfaces of the base part and the clamp part relative to the central axis of the product clamp is between ten and eighteen degrees.

5. The tubular product clamp according to claim 1, wherein each clamp part is provided with an insert carrier securing device at the top end of the slot, for temporarily securing the insert carrier in the slot.

6. The tubular product clamp according to claim 1, wherein each insert carrier has a spherical bottom end received in a corresponding recess provided at a bottom end of the slot of the clamp part.

7. The tubular product clamp according to claim 1, wherein the inserts have a curved gripping surface, such that it the gripping surface substantially fits the circumference of a tubular supported by the product clamp.

8. The tubular clamp according to claim 1, wherein the base part has a left side and a right side provided with cam tracks, the cam tracks extending substantially parallel to the guide surface defined by the front side of the base part,
   wherein the clamp part has a left side and a right side provided with cam tracks, the cam tracks extending substantially parallel to the guide surface defined by the back side of the clamp part, and
   wherein the product clamp further comprises:
   two load transfer rollers each provided between the guide surface of the base part and the guide surface of the clamp part to provide a rolling support for the clamp part; and
   a trolley frame configured for positioning the base part, the clamp part and the load transfer rollers relative to each other, the trolley frame carrying the load transfer rollers, the load transfer rollers each being rotatably mounted,
   wherein the trolley frame is provided with cam followers, with which cam followers the trolley frame engages the cam tracks in the sides of the base part and the clamp part, and
   wherein the guide surface of the base part and the guide surface of the clamp part define between them guide tracks for each of the load transfer rollers, the guide tracks extending at an angle with the axis of the central product passage such that by moving the clamp part relative to the base part, the clamp part being moved along the axis as well as in radial direction thereof.

9. The tubular product clamp according to claim 8, wherein the trolley frame of each clamping device has a left side frame part on the left side of the clamp part and the base part and a right side frame part on the right side of the clamp part and the base part, the left side frame part and the right side frame part carrying the two load transfer rollers therebetween, the load transfer rollers each being rotatably mounted, and
   wherein the left frame part and the right frame part are each provided with cam followers with which cam followers the frame parts engage the cam tracks in the sides of the base part and the clamp part.

10. The tubular product clamp according to claim 9, wherein each clamping device further comprises a yoke configured for positioning the trolley frame relative to the base part and the clamp part while the clamp part is moved relative to the base part, the yoke being at a central part thereof pivotably mounted on the trolley frame, and is at opposite ends thereof provided with slots, one slot engaging a pivot on the base part and the other slot engaging a pivot on the clamp part.

11. The tubular product clamp according to claim 8, wherein the trolley frame of each clamping device has a lower retainer arm and an upper retainer arm on the left side of the clamp part and the base part and a lower retainer arm and an upper retainer arm on the right side of the clamp part and the base part, wherein one load transfer roller is carried between the left lower retainer arm and the right lower retainer arm and one load transfer roller is carried between the left upper retainer arm and the right upper retainer arm, the load transfer rollers each being rotatably mounted, and
    wherein each of the retainer arms has a cam follower at one end for engaging one of the cam tracks provided on the base part and a cam follower at an opposite end for engaging one of the cam tracks provided on the clamp part.

12. The tubular product clamp according to claim 11, wherein the trolley frame has a spacer arm on the left side of the clamp part and the base part and a spacer arm on the right side of the clamp part and the base part, the left side spacer arm is with one end rotationally connected to the left side lower retainer arm and with an opposite end rotationally connected to the left side upper retainer arm, and the right side spacer arm is with one end rotationally connected to the right side lower retainer arm and with an opposite end rotationally connected to the right side upper retainer arm.

13. The tubular product clamp according to claim 12, wherein each clamping device further comprises a yoke configured for positioning the spacer atm relative to the base part and the clamp part while the clamp part is moved relative to the base part, the yoke is at a central part thereof pivotably mounted on the spacer arm, and is at opposite ends thereof provided with slots, one slot engaging a pivot on the base part and the other slot engaging a pivot on the clamp part.

14. A tubular product clamp for supporting a tubular product in a firing line of a drilling rig, the product clamp having a ring frame with three or more clamping devices, which clamping devices are provided at regular intervals along the inside of the ring frame around a central product passage having a central axis, and wherein each clamping device comprises:
    a base part mounted to the ring frame, the base part having a front side that defines a guide surface facing towards the central product passage; and
    a clamp part having a back side that defines a guide surface facing the guide surface defined by the front side of the base part, and a front side facing the central product passage,
    wherein the guide surfaces of the base part and the clamp part define a guide track for guiding the clamp part relative to the base part,
    wherein the guide surfaces, and thus the tracks defined by the guide surfaces, extend at an angle with the central axis of the product passage of the ring frame of the product clamp, such that by moving the clamp part relative to the base part along the guide track, the clamp part is moved along the central axis of the product passage of the ring frame of the product clamp as well as in radial direction thereof,
    wherein the tubular product clamp further comprises an insert carrier for each clamp part having an insert carrier body with one or more recesses for holding one or more inserts for engaging the tubular product supported by the product clamp,
    wherein each clamp part is in a front surface thereof provided with a slot for supporting the insert carrier, the slot extending in a direction parallel to the central axis of the product passage of the ring frame of the product clamp and having an open top end for receiving the insert carrier, such that the insert carrier can be slid onto the clamp part in a downward direction substantially parallel to the central axis of the product passage of the ring frame of the product clamp, and the slot being open towards the central product passage for holding the insert carrier body in the slot with the one or more inserts facing the facing the central axis of the product passage of the ring frame of the product clamp, and
    wherein each of the clamping devices is provided with a positioning device for receiving and positioning a tubular product supported in the central product passage relative to the clamp part, when the clamp part is moved towards that tubular product, the positioning device comprising two guide legs which extend at an angle to each other, such that the two guide legs define a V-shape when seen in a direction along the axis of the central product passage.

15. The tubular product clamp according to claim 14, wherein the positioning device is provided in the form of a V-shaped centering plate mounted at an angle to a plane perpendicular to the central axis of the product passage, such that one leg is located higher than the other leg, which allows for a wide receiving opening in combination with the clamp parts of the clamping devices to be positioned closely adjacent each other and close to the central axis of the product passage.

16. The tubular product clamp according to claim 15, wherein the centering plate has a recess at the center of the receiving opening, for centering a tubular received in the receiving opening.

17. The tubular product clamp according to claim 14, wherein the positioning device is mounted on the clamp part of the clamping device.

18. The tubular product clamp according to claim 14, wherein the positioning device is provided in the form of a centering insert removably mounted in a slot shaped recess provided on either the clamp part or the insert carrier, the slot shaped recess extending at an angle to a plane perpendicular to the axis of the central product passage.

19. An insert carrier for use in a clamping device of the tubular product clamp according to claim 1.

20. An insert carrier for use in a clamping device of the tubular product clamp according to claim 14.

* * * * *